United States Patent
Okazaki et al.

(10) Patent No.: US 11,210,101 B2
(45) Date of Patent: Dec. 28, 2021

(54) ARITHMETIC PROCESSING DEVICE AND CONTROL METHOD IMPLEMENTED BY ARITHMETIC PROCESSING DEVICE

(71) Applicant: FUJITSU LIMITED, Kawasaki (JP)

(72) Inventors: Ryohei Okazaki, Kawasaki (JP); Sota Sakashita, Kawasaki (JP); Atushi Fusejima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 16/547,653

(22) Filed: Aug. 22, 2019

(65) Prior Publication Data

US 2020/0097286 A1 Mar. 26, 2020

(30) Foreign Application Priority Data

Sep. 20, 2018 (JP) .............................. JP2018-176336

(51) Int. Cl.
*G06F 9/30* (2018.01)
*G06F 9/38* (2018.01)

(52) U.S. Cl.
CPC .......... *G06F 9/384* (2013.01); *G06F 9/30098* (2013.01); *G06F 9/30145* (2013.01)

(58) Field of Classification Search
None
See application file for complete search history.

(56) References Cited

U.S. PATENT DOCUMENTS 5,226,126 A * 7/1993 McFarland ......... G06F 9/30003
712/217
6,631,464 B1 10/2003 Mori et al.

FOREIGN PATENT DOCUMENTS

JP 2-255918 10/1990
JP 8-147262 6/1996

OTHER PUBLICATIONS

Shen et al.; Modern Processor Design: Fundamentals of Superscalar Processors, Beta Edition; 2002, McGraw-Hill (Year: 2002).*

* cited by examiner

*Primary Examiner* — Corey S Faherty
(74) *Attorney, Agent, or Firm* — Fujitsu Patent Center

(57) ABSTRACT

An arithmetic processing device includes: a decoding circuit configured to decode a command; a command execution circuit configured to execute the command decoded by the decoding circuit; a register circuit configured to include a plurality of registers for holding data used by the command execution circuit; an identification information holding circuit configured to store identification information for identifying a register for writing a specific value when the command is a register writing command; a setting circuit configured to hold the specific value; and an operation control circuit configured to execute inhibiting processing when the command is a register reading command, the inhibiting processing including inhibiting an access of the register by the register reading command and selecting the specific value held in the setting circuit.

14 Claims, 17 Drawing Sheets

ARITHMETIC PROCESSING DEVICE AND CONTROL METHOD IMPLEMENTED BY ARITHMETIC PROCESSING DEVICE

CROSS-REFERENCE TO RELATED APPLICATION

This application is based upon and claims the benefit of priority of the prior Japanese Patent Application No. 2018-176336, filed on Sep. 20, 2018, the entire contents of which are incorporated herein by reference.

FIELD

The present embodiment relates to an arithmetic processing device and a control method implemented by the arithmetic processing device.

BACKGROUND

An arithmetic processing device such as a processor improves command execution efficiency by incorporating various types of techniques such as command prefetching, pipeline processing, and out-of-order execution. For example, before a branch determination cycle that determines whether to branch based on an execution result of a branch command, an unconditional branch command or the like that may determine the branch is detected and by prefetching the command of a branch destination, an execution efficiency of the command is improved (see, for example, Japanese Laid-open Patent Publication No. 2-255918).

On the other hand, the power consumption of the arithmetic processing device tends to increase as a performance of the arithmetic processing device improves and a technique for inhibiting the increase in the power consumption is important. For example, the power consumption may be reduced by detecting a bit not used for memory access among a plurality of bit address signals output from the arithmetic processing device and setting an address signal line corresponding to the detected bit to a high impedance state. (See, for example, Patent Japanese Laid-open Patent Publication No. 8-147262).

SUMMARY

According to an aspect of the embodiments, an arithmetic processing device includes: a decoding circuit configured to decode a command; a command execution circuit configured to execute the command decoded by the decoding circuit; a register circuit configured to include a plurality of registers for holding data used by the command execution circuit; an identification information holding circuit configured to store identification information for identifying a register for writing a specific value when the command decoded by the decoding circuit is a "register writing command" for requesting that the specific value is written in any of the plurality of registers; a setting circuit configured to hold the specific value; and an operation control circuit configured to execute an inhibiting processing when the command decoded by the decoding circuit is a "register reading command" for requesting that a value is read out from the register identified by the identification information held in the identification information holding circuit, the inhibiting processing including inhibiting an access of the register by the register reading command and selecting the specific value held in the setting circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Recently, in order to improve performance of an arithmetic processing device, the number of registers included in the arithmetic processing device and a bit width of the registers tend to increase. Along with this, a circuit scale of a control circuit for accessing the register increases and a power consumption of the arithmetic processing device tends to increase.

In one aspect, an object of the present embodiment is to inhibit power consumption of an arithmetic processing device.

Hereinafter, the embodiments will be described with reference to the drawings.

Figure 1:
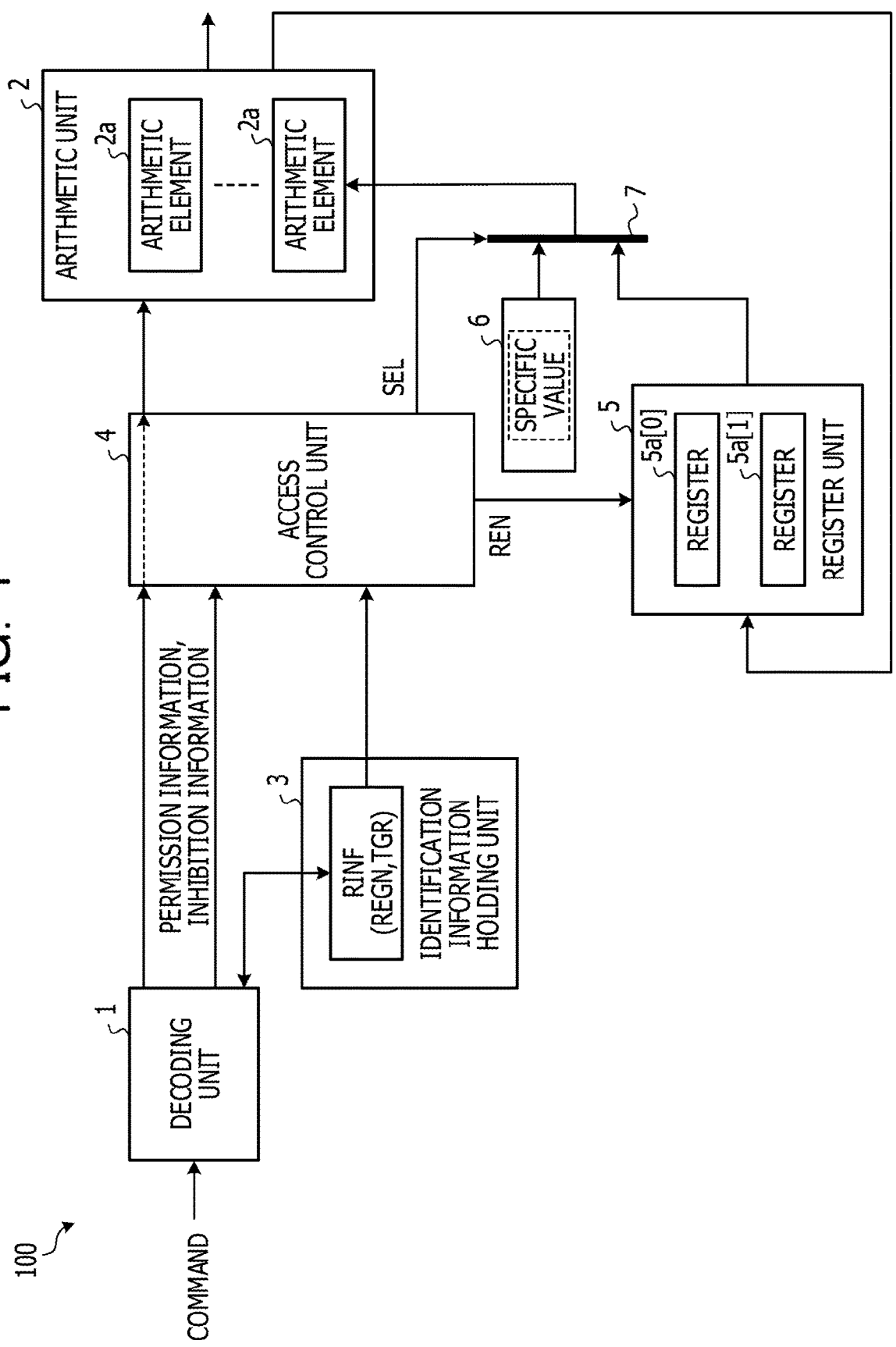
FIG. 1 is a diagram illustrating an example of an arithmetic processing device in an embodiment.

FIG. 1 illustrates an example of an arithmetic processing device in an embodiment. An arithmetic processing device 100 illustrated in FIG. 1 includes a decoding unit 1, an arithmetic unit 2 having a plurality of arithmetic elements 2*a*, an identification information holding unit 3, an access control unit 4, and a register unit 5 including a plurality of registers 5*a* (5*a*[0] and 5*a*[1]), a setting unit 6, and a selector 7. The arithmetic element 2*a* is an example of a command execution unit that executes a command. The access control unit 4 and the selector 7 are an example of an operation control unit.

Each register 5*a* may be a general purpose register as long as the value may be read and written and may be a control register that holds a control value for controlling an operation of the arithmetic element 2*a*. For example, each register 5*a* holds data to be used by the arithmetic unit 2. The number of registers 5*a* of the register unit 5 may be 1 or 3 or more. The arithmetic processing device 100 may be a superscalar processor that fetches a plurality of commands in parallel and executes the fetched plurality of commands in parallel, or may be a processor of another scheme such as a scalar scheme.

The decoding unit 1 decodes the command fetched from a memory such as a primary command cache (not illustrated) and outputs the command to one of the arithmetic elements 2*a* based on the result of the decoding. In a case where the access control unit 4 has a function of a command execution control unit such as a reservation station that controls an execution order of the commands, the command decoded by the decoding unit 1 is output to the arithmetic element 2*a* via the access control unit 4.

In a case where, the decoded command is a writing command for writing a value to any of the registers 5*a* of the register unit 5, the decoding unit 1 outputs the writing command to the arithmetic element 2*a* that executes the writing command. The arithmetic element 2*a* that executes the writing command calculates the value to be written to the register 5*a* by computation. The arithmetic element 2*a* that executes the writing command may be an address arithmetic element that generates an address of a memory (not illustrated) that holds a value to be written to the register 5*a*, and in this case, the writing command is a load command.

The arithmetic element 2*a* that executes the writing command stores data such as a flag value to the register 5*a* to be written. In a case where, the command decoded by the decoding unit 1 is the writing command for writing a specific value (for example, a fixed value such as all 1) to any of the registers 5*a* of the register unit 5, the arithmetic element 2*a* stores the specific value to the register 5*a* to be written.

In a case where, the writing command is a writing command for writing the specific value to any of the registers 5*a*, the decoding unit 1 stores identification information RINF for identifying the register 5*a* to which the specific value is to be written to the identification information holding unit 3. For example, the identification information RINF includes a register number REGN for identifying the register 5*a* to which the specific value is to be written and a flag TGR indicating that the register 5*a* holds the specific value. The writing command for writing a value to any of the registers 5*a* of the register unit 5 is an example of a register writing command. The register number REGN is an example of register information and a value of the flag TGR is an example of flag information.

For example, in a case where the register 5*a* to be identified by the register number REGN holds the specific value, the flag TGR is maintained in a set state and in a case where the register 5*a* to be identified by the register number REGN holds a value other than the specific value, the flag TGR is maintained in a reset state. Hereinafter, the register number REGN held in the identification information holding unit 3 together with the flag TGR in the set state is also referred to as being valid and the register number REGN held in the identification information holding unit 3 together with the flag TGR in the reset state is also referred to as being invalid.

On the other hand, in a case where the decoded command is a reading command for reading a value from any of the registers 5*a*, the decoding unit 1 refers to the identification information RINF to be held by the identification information holding unit 3. The reading command for reading the value from any of registers 5*a* is an example of a register reading command. The decoding unit 1 determines whether the register 5*a* to be read is the register 5*a* indicated by the register number REGN and determines whether the register 5*a* holds the specific value based on the flag TGR. For example, the reading command is an arithmetic command for executing an operation using the value held in the register 5*a* as an operand, or a store command for storing the value held in the register 5*a* in a memory.

In a case where, the register 5*a* to be read does not hold the specific value, the decoding unit 1 outputs permission information for permitting reading of the value from the register 5*a* to be read to the access control unit 4. The access control unit 4 outputs a read enable signal REN to the register unit 5 to access the register 5*a* to be read and causes the register 5*a* to be read to output the held value based on the permission information. In addition, the access control unit 4 outputs a selection signal SEL for selecting the output of the register 5*a* to be read to the selector 7. The selector 7 selects a value to be output from the register 5*a* to be read and outputs the selected value to the arithmetic unit 2. That is, the access control unit 4 and the selector 7 permit the read access of the register 5*a* to select the value held by the register 5*a* and execute the permission operation of not selecting the specific value which is set in the setting unit 6.

On the other hand, in a case where, the register 5*a* to be read does hold the specific value, the decoding unit 1 outputs inhibition information for inhibiting reading of the value from the register 5*a* to be read to the access control unit 4. The access control unit 4 inhibits an output of the read enable signal REN to the register unit 5 based on the inhibition information and outputs the selection signal SEL which causes the setting unit 6 to select the specific value set in advance to the selector 7. The register unit 5 which does not receive the read enable signal REN is maintained in a standby state and inhibits access of the register 5*a* to be read. The selector 7 selects the specific value set to the setting unit 6 and outputs the selected specific value to the arithmetic unit 2. That is, the access control unit 4 and the selector 7 inhibit the read access of the register 5*a* and execute the inhibiting operation of selecting the specific value set in the setting unit 6.

The arithmetic element 2*a* that executes the reading command executes an operation using a value read from the register 5*a* to be read or the specific value read from the setting unit 6. For example, the setting unit 6 includes an element to which the specific value such as a plurality of latch circuits, a plurality of wiring patterns, or a program circuit is set. In a case where the setting unit 6 includes the plurality of latch circuits, when the arithmetic processing device 100 starts up, each bit having a specific value is stored in each latch circuit.

In a case where, the setting unit 6 includes the plurality of wiring patterns, each wiring pattern corresponds to each bit having the specific value. Each wiring pattern corresponds to a photomask pattern for manufacturing the arithmetic processing device 100. When each wiring pattern is connected to a power supply line pattern or a ground line pattern, the specific value is set to the setting unit 6.

In a case where, the setting unit 6 includes the program circuit, the program circuit is a fuse circuit in which the value of each bit of the specific value is set, or a read only memory (ROM) circuit which stores each bit of the specific value. For example, the program circuit is programmed in manufacturing processing of the arithmetic processing device 100. In a case where the ROM, which is the program circuit, includes an electrically rewritable memory element, the program circuit may be programmed after the manufacturing of the arithmetic processing device 100. The specific value is set to the setting unit 6 by the program of the program circuit.

For example, the setting unit 6 outputs a voltage level corresponding to the set specific value to the selector 7. That is, the setting unit 6 holds the specific value statically and the specific value set in the setting unit 6 is statically read. Therefore, the power consumed to read out a setting value set in the setting unit 6 is almost zero.

On the other hand, the power consumed by the register unit 5 for reading out the specific value held in the register 5a is greater than the power consumed by the setting unit 6 for reading out the specific value set in the setting unit 6. This is because the register unit 5 has a control circuit for selecting a plurality of registers 5a, and in a case where, the register 5a is read and accessed, not only the register 5a alone but also the entire register unit 5 consumes power. The power consumed by the register unit 5 at the time of read access to the register 5a increases as the number of the registers 5a included in the register unit 5 increases and increases as the bit width of the register 5a increases. Furthermore, in a case where, the number of bits (bit width) of the register 5a is larger than the number of bits of the specific value, since the value of bits other than the bit corresponding to the specific value is also read from the register 5a, unnecessary power is generated.

Figure 2:
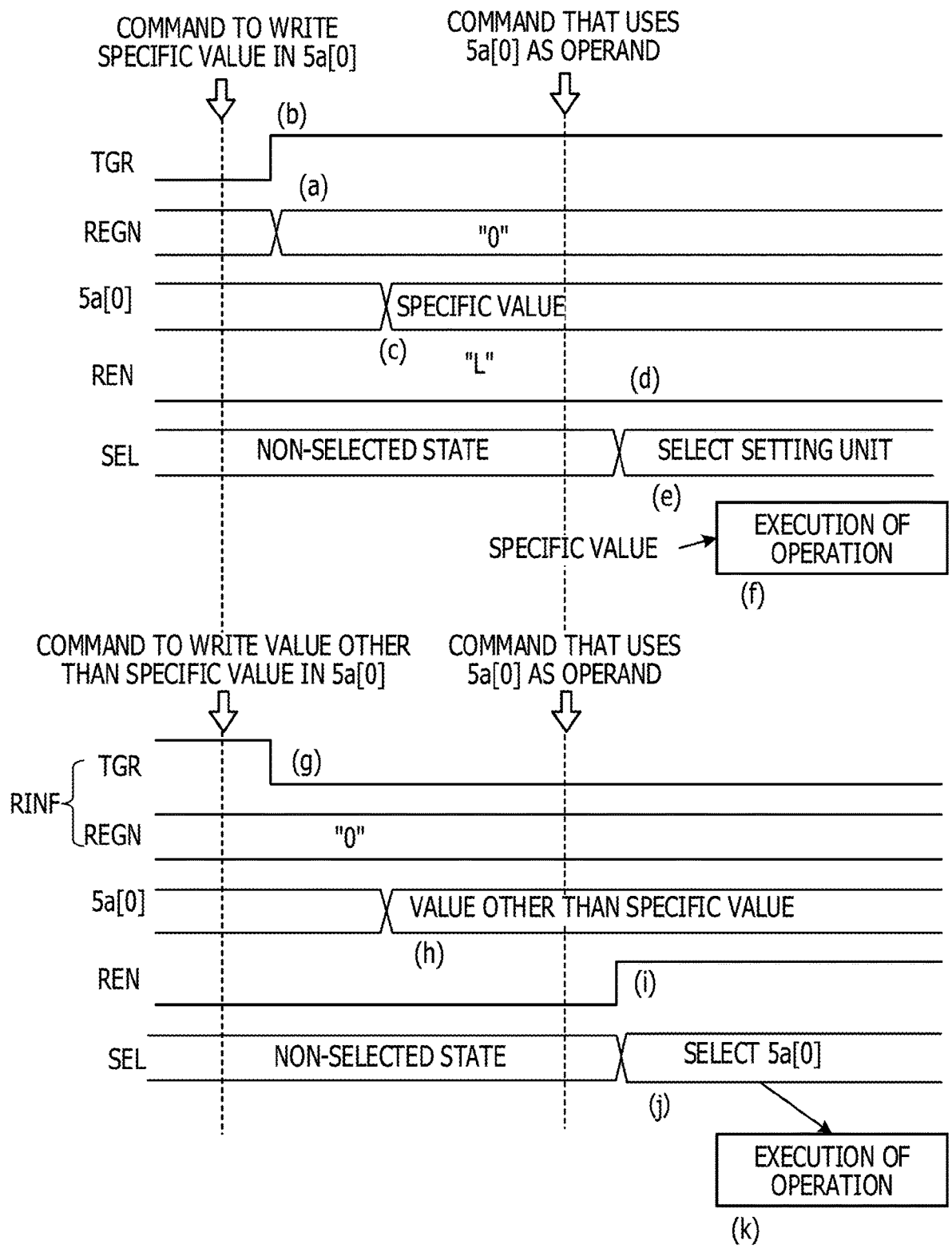
FIG. 2 is a diagram illustrating an example of operations of the arithmetic processing device illustrated in FIG. 1.

FIG. 2 is a diagram illustrating an example of operations of the arithmetic processing device 100 illustrated in FIG. 1. That is, FIG. 2 illustrates an example of a method for controlling the arithmetic processing device 100. In the operation illustrated in the upper side of FIG. 2, in an initial state, since the identification information holding unit 3 holds the flag TGR in a reset state (=low level), the register number REGN is invalid. In the operation illustrated in the lower side of FIG. 2, in the initial state, since the identification information holding unit 3 holds the flag TGR in a reset state(=high level), the register number REGN(="0") is invalid and indicates the register 5a[0].

In the operation illustrated in the upper side of FIG. 2, the decoding unit 1 decodes a writing command for writing the specific value to the register 5a[0]. The decoding unit 1 stores the register number REGN(="0") indicating the register 5a[0] in the identification information holding unit 3 and updates the identification information RINF by setting the flag TGR to the high level (see (a) and (b) of FIG. 2). The arithmetic element 2a writes the specific value to the register 5a[0] based on the writing command received from the decoding unit 1 ((c) of FIG. 2).

Next, the decoding unit 1 decodes a command (reading command) that uses the value held in the register 5a[0] as an operand. The decoding unit 1 refers to the identification information RINF held in the identification information holding unit 3. The decoding unit 1 outputs the inhibition information to the access control unit 4 based on a fact that the register number REGN indicates the register 5a[0] and the flag TGR is set.

The access control unit 4 maintains the read enable signal REN at an invalid level (for example, low level) based on the inhibition information from the decoding unit 1 and outputs the selection signal SEL for selecting the setting unit 6 to the selector 7 (see (d) and (e) of FIG. 2). By the read enable signal REN at the invalid level, the register unit 5 does not execute the read operation for reading the value from the register 5a and maintains the standby state.

The selector 7 selects the specific value set to the setting unit 6 based on the selection signal SEL and outputs the selected specific value to the arithmetic unit 2. That is, the access control unit 4 and the selector 7 inhibit the read access of the register 5a and execute the inhibiting operation of selecting the specific value set in the setting unit 6. The arithmetic element 2a that executes the reading command in the arithmetic unit 2 executes the operation using the specific value set in the setting unit 6 as an operand ((f) of FIG. 2). By using the specific value set in the setting unit 6 instead of reading the specific value from the register 5a, compared to the case where the register 5a is accessed to read the specific value from the register 5a, the power consumption of the arithmetic processing device 100 may be reduced.

In a case where, an address is assigned to the register 5a, the access control unit 4 outputs the read enable signal REN and an address identifying the register 5a to be accessed to the register unit 5. In this case, the register unit 5 has a decoding circuit that determines the register 5a to be accessed based on the decoding of the address. In a case where, the access control unit 4 receives the inhibition information from the decoding unit 1, the access control unit 4 maintains the address output to the register unit 5 without changing from a logic of the address output in the previous register access cycle. Accordingly, charging and discharging of the address line transmitting the address may be inhibited and the power consumption of the arithmetic processing device 100 may be further reduced. For example, the register unit 5 is a register file.

In the operation illustrated in the lower side of FIG. 2, the decoding unit 1 decodes a writing command for writing a value other than the specific value to the register 5a[0]. The decoding unit 1 resets the flag TGR to the low level, thereby updating the identification information RINF and invalidating the register number REGN ((g) of FIG. 2). The arithmetic element 2a writes a value other than the specific value to the register 5a[0] based on the writing command received from the decoding unit 1 ((h) of FIG. 2).

Next, the decoding unit 1 decodes a command (reading command) that uses the value held in the register 5a[0] as an operand. The decoding unit 1 refers to the identification information RINF held in the identification information holding unit 3. The decoding unit 1 determines that the register number REGN is invalid based on the fact that the flag TGR is reset and outputs the permission information to the access control unit 4.

The access control unit 4 sets the read enable signal REN to a valid level (for example, high level) based on the permission information from the decoding unit 1 and sets the selection signal SEL to a value for selecting the output of register 5a[0] ((i) and (j) of FIG. 2). Accordingly, the value held in the register 5a[0] is output to the arithmetic unit 2 via the selector 7. That is, the access control unit 4 and the selector 7 permits the read access of the register 5a and execute the permission operation of not selecting the specific value which is set in the setting unit 6. The arithmetic element 2a that executes the reading command in the arithmetic unit 2 executes the operation using a value other than the specific value read out from the register 5a[0] as an operand ((k) of FIG. 2).

In a case where, the register 5a[0] is rewritten to a value other than the specific value, by resetting the flag TGR, it is possible to inhibit the specific value set in the setting unit 6 from being selected in the reading command using the value held in register 5a[0]. Therefore, it is possible to inhibit the arithmetic element 2a from executing an operation using an incorrect value (in this example, the specific value), and it is possible to inhibit a malfunction of the arithmetic processing device 100. In addition, since the flag TGR may determine whether the register number REGN is valid or invalid, the decoding unit 1 may detect that the register 5a[0] does not hold the specific value without reading the register number REGN from the identification information holding unit 3.

Figure 3:
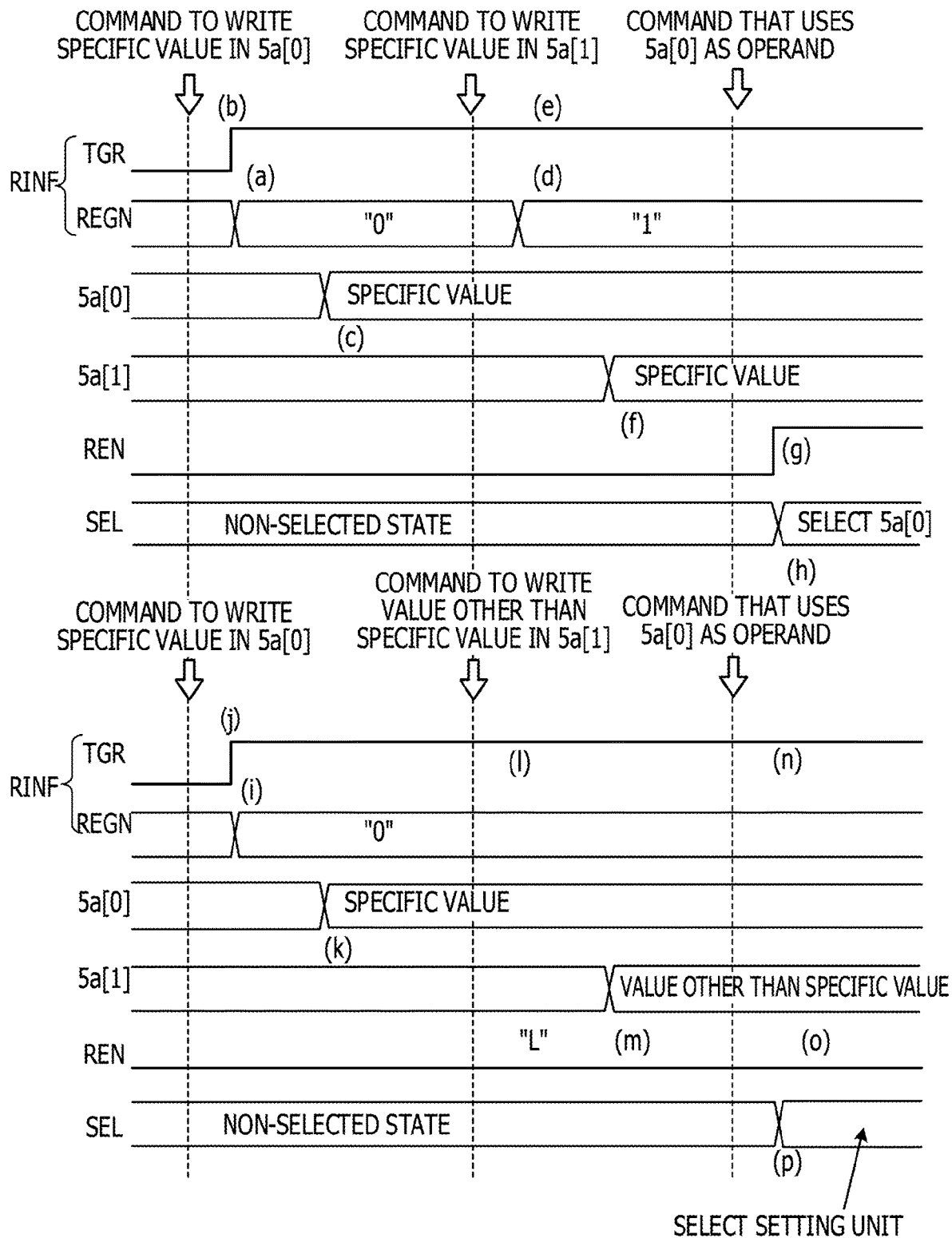
FIG. 3 is a diagram illustrating another example of operations of the arithmetic processing device illustrated in FIG. 1.

FIG. 3 is a diagram illustrating another example of operations of the arithmetic processing device 100 illustrated in FIG. 1. That is, FIG. 3 illustrates another example of a method for controlling the arithmetic processing device 100. Detailed description of operations that are similar to those illustrated in FIG. 2 is omitted.

In the operation illustrated in the upper side of FIG. 3, the decoding unit 1 decodes a writing command for writing the specific value to the register 5a[0]. The decoding unit 1 sets the identification information RINF as in (a) and (b) of FIG. 2((a) and (b) of FIG. 3). Similar to (c) of FIG. 2, the arithmetic element 2a writes the specific value to the register 5a[0] ((c) of FIG. 3).

Next, the decoding unit 1 decodes a writing command for writing the specific value to the register 5a[1]. The decoding unit 1 stores the register number REGN(="1") indicating the register 5a[1] in the identification information holding unit 3 and updates the identification information RINF by setting the flag TGR to the high level (see (d) and (e) of FIG. 3). Similar to (c) of FIG. 3, the arithmetic element 2a writes the specific value to the register 5a[1] ((f) of FIG. 3).

Next, the decoding unit 1 decodes a command (reading command) that uses the value held in the register 5a[0] as an operand. Since the decoding unit 1 refers to the flag TGR held in the identification information holding unit 3 and the flag TGR is reset, the decoding unit 1 refers to the register number REGN. The decoding unit 1 determines that register 5a[0] holds a value other than the specific value and outputs the permission information instructing access control unit 4 to access register 5a[0] based on the fact that the register number REGN does not indicate the register 5a[0].

Similar to (i) and (j) of FIG. 2, the access control unit 4 sets the read enable signal REN to a valid level based on the permission information from the decoding unit 1 and sets the selection signal SEL to a value for selecting the output of register 5a[0] ((g) and (h) of FIG. 3). The arithmetic element 2a executes the operation using the specific value read from the register 5a[0] as an operand.

As illustrated in the operation on the upper side of FIG. 3, in a case where, a plurality of registers 5a hold the specific value and the reading command for reading out the specific value from other than the register 5a to which the specific value is most recently written is decoded, the decoding unit 1 permits access to the register 5a. Accordingly, even in a case where the identification information RINF held in the identification information holding unit 3 is shared by the plurality of registers 5a, it is possible to output a correct value to the arithmetic element 2a while reducing the power consumption.

It is assumed that a value other than the specific value is written to the register 5a[0] before the decoding unit 1 decodes the reading command that uses the value held in the register 5a[0] as an operand. Also in this case, similar to the operation in the lower side of FIG. 2, the correct value (value other than the specific value) held by the register 5a[0] may be output to the arithmetic element 2a based on the reading command.

In the operation illustrated on the lower side of FIG. 3, the decoding unit 1 decodes a writing command for writing the specific value to the register 5a[0] and similar to (a) and (b) of FIG. 3, the decoding unit 1 sets the identification information RINF ((i) and (j) of FIG. 3). Similar to (c) of FIG. 3, the arithmetic element 2a writes the specific value to the register 5a[0] ((k) of FIG. 3).

Next, the decoding unit 1 decodes the writing command for writing a value other than the specific value to the register 5a[1]. Since the decoding unit 1 does not hold the register number REGN indicating the register 5a[1] in the identification information holding unit 3, the decoding unit 1 does not execute rewriting of the identification information RINF held in the identification information holding unit 3 ((l) of FIG. 3). That is, the flag TGR is not reset but is maintained in the set state. Similar to (h) of FIG. 2, the arithmetic element 2a writes a value other than the specific value to the register 5a[1] ((m) of FIG. 3).

Next, the decoding unit 1 decodes a command (reading command) that uses the value held in the register 5a[0] as an operand. The decoding unit 1 refers to the identification information RINF held in the identification information holding unit 3. The decoding unit 1 outputs the inhibition information to the access control unit 4 based on a fact that the register number REGN indicates the register 5a[0] and the flag TGR is set.

Similar to (d) and (e) of FIG. 2, the access control unit 4 maintains the read enable signal REN at an invalid level based on the inhibition information and outputs the selection signal SEL for selecting the setting unit 6 to the selector 7 (see (o) and (p) of FIG. 3). The arithmetic element 2a that executes the reading command executes the operation using the specific value set in the setting unit 6 as an operand.

In the operation illustrated on the lower side of FIG. 3, in a case where the writing command is issued to write other than the specific value in the register 5a different from the register 5a corresponding to the register number REGN held in the identification information holding unit 3, it inhibits the flag TGR from being reset. Accordingly, the invalidation of the register number REGN held in the identification information holding unit 3 may be inhibited. Therefore, access to register 5a[0] may be inhibited in response to the reading command for the register 5a[0] corresponding to register number REGN, and the power consumption may be reduced as compared with the case where the specific value is read out from the register 5a[0].

In a superscalar system, in a case where the decoding unit 1 decodes a plurality of writing commands to write the specific value in each of a plurality of registers 5a in parallel (for example, simultaneously), the decoding unit 1 sequentially sets the identification information RINF in the order of the writing commands described in the program. That is, in a case where a plurality of writing commands to write the specific value to each of the plurality of the registers 5a is decoded in parallel, the identification information RINF is set corresponding to the writing command described last among the plurality of writing commands described in the program.

Figure 4:
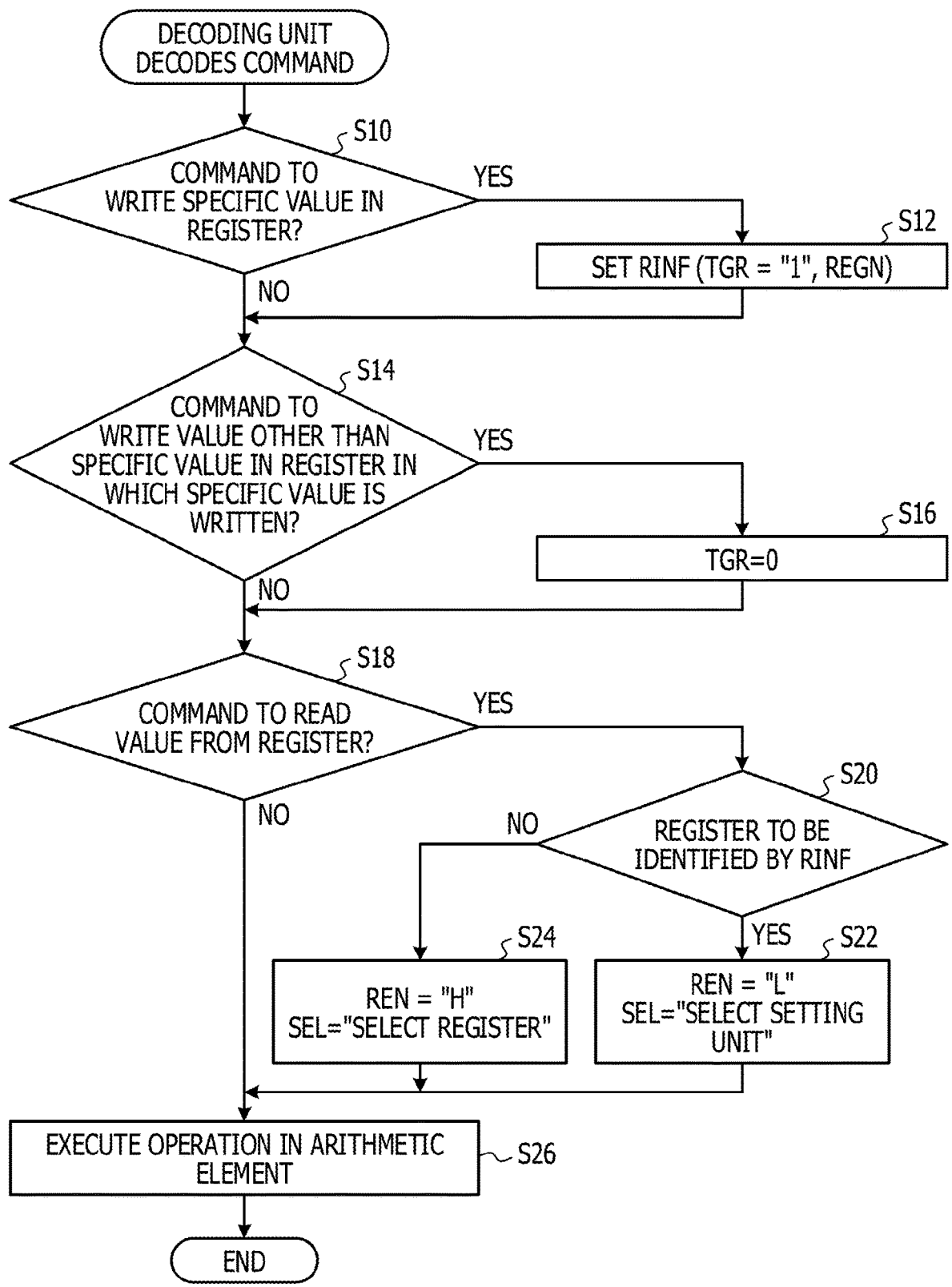
FIG. 4 is a diagram illustrating an example of operation flows of the arithmetic processing device illustrated in FIG. 1.

FIG. 4 is a diagram illustrating an example of operation flows of the arithmetic processing device 100 illustrated in FIG. 1. That is, FIG. 4 illustrates an example of a method for controlling the arithmetic processing device 100. The operation flow illustrated in FIG. 4 is started based on the fact that the decoding unit 1 is decoded a command.

First, in step S10, the decoding unit 1 determines whether the decoded command is the writing command for writing the specific value in the register 5a. In a case of the writing command for writing the specific value to the register 5a, the operation proceeds to step S12, and in a case of no writing command for writing the specific value to the register 5a, the operation proceeds to step S14. In step S12, the decoding unit 1 sets the identification information RINF (flag TGR="1" and register number REGN) in the identification information holding unit 3, and proceeds to the operation to step S14.

First, in step S14, the decoding unit 1 determines whether the decoded command is the writing command for writing a value other than the specific value in the register 5a. In a case of the writing command for writing a value other than the specific value to the register 5a, the operation proceeds to step S16, and in a case of no writing command for writing a value other than the specific value to the register 5a, the operation proceeds to step S18. The fact that the register 5a to be written holds the specific value means that the register number REGN held in the identification information holding unit 3 matches the number of the register 5a to be written and it is determined that the flag TGR held in the identification information holding unit 3 is in the set state. In step S16, the decoding unit 1 resets the flag TGR of the identification information holding unit 3 to "0" (that is, low level), and proceeds to the operation to step S18.

First, in step S18, the decoding unit 1 determines whether the decoded command is the reading command for reading a value from the register 5a. In a case of the reading command for reading a value from the register 5a, the operation proceeds to step S20, and in a case of no reading command for reading the value from the register 5a, the operation proceeds to step S26.

In step S20, the decoding unit 1 determines whether it is a reading command for reading a value from the register 5a identified by the identification information RINF stored in the identification information holding unit 3. In a case of the reading command for reading a value from the register 5a to be identified by the identification information RINF, the operation proceeds to step S22, and in a case of no reading command for reading the value other than the register 5a to be identified by the identification information RINF, the operation proceeds to step S24.

Here, the number of the register 5a to be read by the reading command matches the register number REGN and in a case where the flag TGR is set, it is determined that it is a reading command for reading the value from the register 5a to be identified by the identification information RINF. On the other hand, in a case where the flag TGR is reset, it is determined that it is not the reading command for reading the value from the register 5a to be identified by the identification information RINF. In addition, even when the flag TGR is set, in a case where the number of the register 5a to be read does not match the register number REGN, it is determined that it is not the reading command for reading the value from the register 5a to be identified by the identification information RINF.

In step S22, the access control unit 4 sets the read enable signal REN to an invalid level (for example, low level "L"), sets the selection signal SEL to a value for selecting the setting unit 6, and proceeds to the operation to step S26. In step S24, the access control unit 4 sets the read enable signal REN to a valid level (for example, high level "H"), sets the selection signal SEL to a value for selecting the register 5a, and proceeds to the operation to step S26. In step S26, the arithmetic element 2a executes the command decoded by the decoding unit 1 and ends the operation illustrated in FIG. 4. As described above, the operations illustrated in FIGS. 2 and 3 are realized.

For example, in a case where the decoded command decoded by the decoding unit 1 is a writing command for writing a value to the registers 5a, the arithmetic element 2a that executes the writing command writes the value in the register 5a to be written. In a case where the command decoded by the decoding unit 1 is a reading command for reading the value from the register 5a, the arithmetic element 2a that executes the reading command executes an operation using the value output from any of the setting unit 6 and the register 5a and the operation result is stored in the register 5a to be stored.

Figure 5:
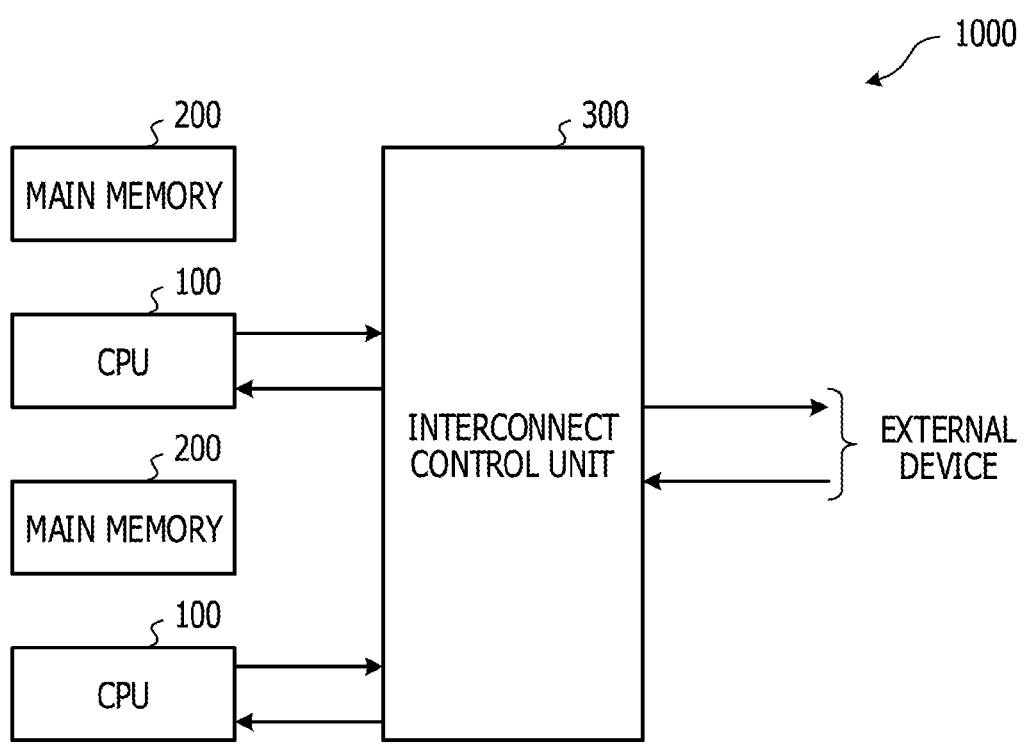
FIG. 5 is a diagram illustrating an example of an information processing system including the arithmetic processing device of FIG. 1.

FIG. 5 is a diagram illustrating an example of an information processing system including the arithmetic processing device 100 of FIG. 1. An information processing system illustrated in FIG. 5 is, for example, a server 1000. The server 1000 includes a plurality of arithmetic processing devices 100, a plurality of main memories 200, and an interconnect control unit 300. For example, the arithmetic processing device 100 is a central processing unit (CPU), and is connected to the interconnect control unit 300. Each main memory 200 is connected to the corresponding arithmetic processing device 100. The interconnect control unit 300 is connected to an external device such as a hard disk device or a communication device to execute an input and output control to the external device.

Hereinafter, in the embodiment illustrated in FIGS. 1 to 5, in a case where the writing command for writing the specific value is decoded in the register 5a, the decoding unit 1 stores the identification information RINF for identifying the register 5a in which the specific value is written to the identification information holding unit 3. In addition, in a case where the decoded reading command is the reading command for reading the value from the register 5a identified by the identification information RINF held in the identification information holding unit 3, the decoding unit 1 outputs the inhibition information to the access control unit 4. The access control unit 4 inhibits an access of the register 5a based on the inhibition information, causes the selector 7 to select the specific value set in the setting unit 6, and outputs the selected specific value to the arithmetic unit 2. Accordingly, in also a case where the operation is executed based on the reading command for reading the specific value from the register 5a, the operation may be executed using the specific value without accessing the register 5a. As a result, the power consumption of the arithmetic processing device 100 may be reduced compared with a case where the specific value is readout by accessing the register 5a.

In addition, in a case where the decoded reading command is the reading command for reading the value from other than the register 5a identified by the identification information RINF held in the identification information holding unit 3, the decoding unit 1 outputs the permission information to the access control unit 4. The access control unit 4 permits an access of the register 5a based on the permission information, causes the selector 7 to select the output of the register 5a, and outputs the selected specific value to the arithmetic unit 2. Accordingly, even in a case where the identification information RINF held in the identification information holding unit 3 is shared by the plurality of registers 5a, it is possible to output a correct value to the arithmetic element 2a while reducing the power consumption.

The access control unit 4 which received the inhibition information from the decoding unit 1, maintains the address output to the register unit 5 without changing from a logic of the address output in the previous register access cycle. Accordingly, charging and discharging of the address line transmitting the address may be inhibited and the power consumption of the arithmetic processing device 100 may be further reduced. Since the flag TGR may determine whether the register number REGN is valid or invalid, the decoding unit 1 may detect that the register 5a does not hold the specific value without reading the register number REGN from the identification information holding unit 3.

Figure 6:
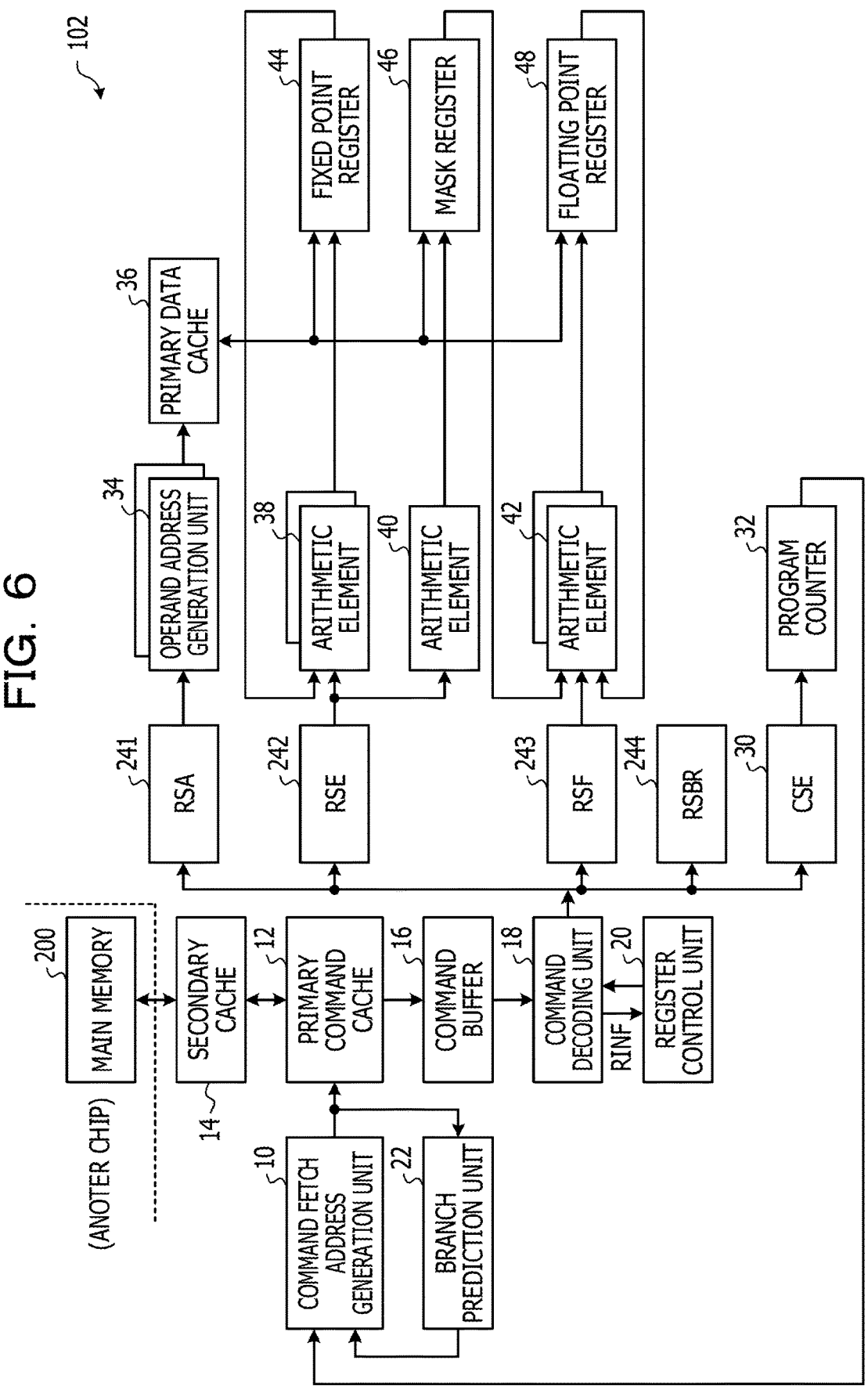
FIG. 6 is a diagram illustrating an example of an arithmetic processing device in another embodiment.

FIG. 6 illustrates an example of an arithmetic processing device in the other embodiment. Elements that are the same as or similar to the elements described in FIGS. 1 to 5 are given the same reference numerals, and detailed descriptions thereof will be omitted. An arithmetic processing device 102 illustrated in FIG. 6 is, for example, a superscalar processor. The arithmetic processing device 102 may be a processor of another type such as scalar processor and is not limited to the configuration illustrated in FIG. 2. In addition, the information processing system including the arithmetic processing device 102 has the same configuration as that of FIG. 5 and is realized by replacing the reference numeral of CPU of FIGS. 5 to 102.

The arithmetic processing device 102 includes a command fetch address generation unit 10, a primary command cache 12, a secondary cache 14, a command buffer 16, a command decoding unit 18, a register control unit 20, and a branch prediction unit 22. In addition, the arithmetic processing device 102 further includes a reservation station 24 (241, 242, 243, and 244), a commit control unit 30, a program counter 32, an operand address generation unit 34, and a primary data cache 36. Furthermore, the arithmetic processing device 102 further includes arithmetic elements 38, 40, and 42, a fixed point register 44, a mask register 46, and a floating point register 48.

Hereinafter, the fixed point register 44, the mask register 46, and the floating point register 48 are also referred to as the registers 44, 46, and 48. The arithmetic elements 38, 40, and 42 are an example of a command execution unit.

The command fetch address generation unit 10 selects an address sequentially generated internally or an address received from the branch prediction unit 22 and generates an address for fetching a command to be executed by the arithmetic elements 38, 40, and 42, a command for memory access, or a branch command from the primary command cache 12. The command fetch address generation unit 10 outputs the generated address to the primary command cache 12. When a pipeline clear described later occurs, the value of the program counter 32 is used to resume command fetching.

The primary command cache 12 fetches the command held in the region indicated by the address from the command fetch address generation unit 10 and outputs the fetched command to the command buffer 16. In a case where the command corresponding to the address is not held, the primary command cache 12 outputs an access request to the secondary cache 14 in order to fetch the command from the secondary cache 14. The secondary cache holds commands and data.

The secondary cache 14 fetches the command held corresponding to the address based on the access request and outputs the fetched command to the primary command cache 12. In a case where the secondary cache 14 does not hold the command corresponding to the address, the secondary cache 14 outputs an access request to the main memory 200 in order to fetch the command from the main memory 200. For example, the main memory 200 is included in a semiconductor chip other than a semiconductor chip including the arithmetic processing device 102.

The command buffer 16 holds a command output from the primary command cache 12 and outputs the held command to the command decoding unit 18. For example, the command buffer 16 outputs four commands in parallel to the command decoding unit 18.

The command decoding unit 18 decodes a plurality of commands output from the command buffer 16 and determines a reservation station 24 (one of 241, 242, 243, and 244) for outputting each command. The command decoding unit 18 issues each command to the determined reservation station 24. The command decoding unit 18 is an example of a decoding unit that decodes a command.

For example, when the decoded command is a memory access command (load command or store command), the command decoding unit 18 issues the command to the reservation station 241. The command decoding unit 18 inputs a command to the reservation station 242 when the decoded command is an arithmetic instruction of fixed point numbers. The command decoding unit 18 inputs a command to the reservation station 243 when the decoded command is an arithmetic instruction of floating point numbers. In a case where the decoded command is a branch command, the command decoding unit 18 inputs a command to the reservation station 244.

In addition, the command decoding unit 18 assigns a command identifier (IID: Command Identification) to the command in accordance with the order of the descriptions in the program executed by the arithmetic processing device 102 and outputs the assigned command identifier to the commit control unit 30. The command buffer 16 and the command decoding unit 18 process a plurality of commands in parallel without replacing the order of the descriptions in the program (in order).

Furthermore, in a case where the command decoding unit 18 decodes a writing command for writing a specific value that is a specific mask value to the mask register 46, the command decoding unit 18 outputs, to the register control unit 20, the identification information RINF identifying the mask register 46 to which the specific value is written. For example, the writing command for writing the specific value to the mask register 46 is included in the command set as a dedicated command. In a case where the command decoding unit 18 decodes the reading command for reading the mask value held in the mask register 46, the command decoding unit 18 inquires the register control unit 20 whether the mask register 46 to be read by the reading command holds a specific value.

Hereinafter, the writing command for writing the specific value or a value other than the specific value in the mask register 46 is also referred to as a mask writing command, and the reading command for reading the mask value held in the mask register 46 is also referred to as a mask reading command. The mask writing command is an example of a register writing command, and the mask reading command is an example of a register reading command.

Figure 7:
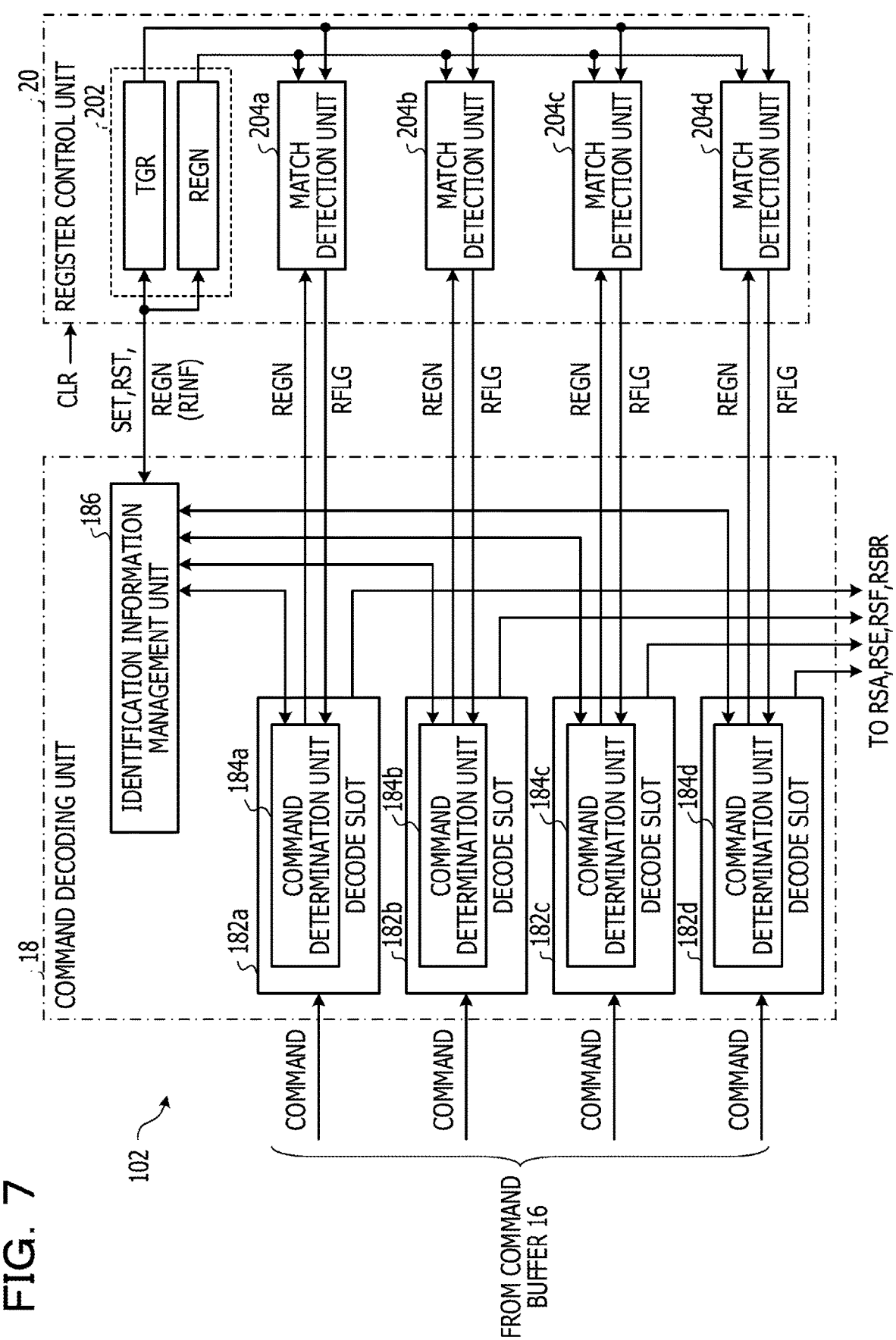
FIG. 7 is a diagram illustrating an example of a command decoding unit and a register control unit of FIG. 6.

The register control unit 20 holds the identification information RINF from the command decoding unit 18 and outputs information indicating whether the mask register 46 to be read holds the specific value to the command decoding unit 18 based on the inquiry from the command decoding unit 18. Examples of the command decoding unit 18 and the register control unit 20 are illustrated in FIG. 7. The register control unit 20 may be provided in the command decoding unit 18.

The branch prediction unit 22 predicts whether the branch is to be executed by the branch command based on the address generated by the command fetch address generation unit 10, and in case of predicting the branch, outputs the branch destination address to the command fetch address generation unit 10.

The reservation station 241 holds memory access commands sequentially received from the command decoding unit 18 and outputs the held memory access commands to the operand address generation unit 34 in the order in which the commands may be executed. Hereinafter, the reservation station 241 is also referred to as a reservation station for address generation (RSA) 241. The reservation station 242 holds arithmetic commands of fixed point numbers sequentially received from the command decoding unit 18, and outputs the held arithmetic commands to the arithmetic elements 38 or 40 in the order in which the commands may be executed. Hereinafter, the reservation station 242 is also referred to as a reservation station for execution (RSE) 242.

The reservation station 243 holds arithmetic commands of floating point numbers sequentially received from the command decoding unit 18, and outputs the held arithmetic commands to the arithmetic element 42 in the order in which the commands may be executed. Hereinafter, the reservation station 243 is also referred to as a reservation station for floating point (RSF) 243. The reservation station 244 holds branch commands sequentially received from the command decoding unit 18 until it may determine a branch. In the following, the reservation station 244 is also referred to as a reservation station for branch (RSBR) 244. The commands held in the reservation stations 241, 242, 243 and 244 are issued to one of the corresponding operand address generation unit 34 and the arithmetic elements 38, 40 and 42, respectively, from those ready for execution of the command. Then, the commands issued to the arithmetic elements 38, 40, and 42 are executed (out of order) regardless of the order of the commands described in the program.

The commit control unit 30 has a queue structure holding unit that stores the commands decoded by the command decoding unit 18 in the order of the commands described in the program, and a completion processing unit that executes completion processing. The completion processing unit executes command completion processing in the order described in the program based on the information held in the holding unit and the completion report of command execution from the arithmetic elements 38, 40, and 42 (in order). Hereinafter, the commit control unit 30 is also referred to as a commit stack entry (CSE) 30. The commit control unit 30 is an example of a completion processing unit that executes command completion processing in-order based on a command that has been completely executed due to out-of-order. Hereinafter, the command completion processing is also referred to as commit.

The program counter 32 updates the memory address indicating the storage destination of the command based on the instruction from the commit control unit 30 and outputs the updated memory address to the command fetch address generation unit 10.

The operand address generation unit 34 generates an address based on a memory access command input from the RSA 241 and outputs the generated address to the primary data cache 36. The primary data cache 36 is accessed by the address from the operand address generation unit 34 to input and output data. Although the arithmetic processing device 102 has a plurality of operand address generation units 34 in FIG. 6, the number of the operand address generation units 34 may be single.

In a case where the primary data cache 36 does not hold the data corresponding to the address, similar to the primary command cache 12, the primary data cache 36 outputs an access request to the secondary cache 14 in order to fetch data from the secondary cache 14. For example, in the load command, the primary data cache 36 stores the fetched data in any of the registers 44, 46, and 48.

The arithmetic element 38 is an arithmetic element for fixed point numbers. The arithmetic processing device 102 may have a plurality of arithmetic elements 38 in order to parallelly execute arithmetic commands of fixed point numbers decoded in parallel by the command decoding unit 18. The arithmetic element 38 acquires data to be used for the operation from the register 44 and stores the operation result in the register 44.

The arithmetic element 40 has a logical operation function for calculating the mask value stored in the mask register 46. For example, the arithmetic element 40 executes a logical operation or arithmetic operation based on a command for writing a mask value to the mask register 46, generates a mask value to be written to the mask register 46, and writes the generated mask value to the mask register 46. The arithmetic element 40 may be a dedicated arithmetic element for the mask register 46 that writes the mask value to the mask register 46, or may be a general purpose arithmetic element that writes data to the mask register 46 and the fixed point register 44. In addition, in a case where the command decoding unit 18 decodes the specific value writing command dedicated to writing a specific value to the mask register 46, the arithmetic element 40 executes an operation to write the mask value included in the command to the mask register 46.

The arithmetic element 42 is an arithmetic element for floating point numbers. For example, the arithmetic processing device 102 may have a plurality of arithmetic elements 42 in order to parallelly execute arithmetic commands of floating point numbers decoded in parallel by the command decoding unit 18. The arithmetic element 42 acquires data to be used for the operation from the register 48 and stores the operation result in the register 48.

For example, in a case where a single command multiple data (SIMD) arithmetic command to execute a product-sum operation of floating point numbers is issued from the RSF 243, the arithmetic element 42 masks the execution of the SIMD operation for each data according to the mask value held in the mask register 46. The arithmetic element 42 may include an arithmetic element that performs product-sum operation, integer operation, logical operation, and the like.

The fixed point register 44 holds data used for an operation to be executed by an arithmetic element 38 and holds an execution result of the operation by the arithmetic element 38. The mask register 46 holds the mask value output from the arithmetic element 40. The mask value held in the mask register 46 is transferred to the arithmetic element 42 as one of the operands, for example, when the arithmetic element 42 executes a SIMD arithmetic command. The mask register 46 is an example of a control register that holds a control value (that is, a mask value) that controls the operation of the arithmetic element 42. The floating point register 48 holds data used for the operation executed by the arithmetic element 42, and holds the execution result of the operation executed by arithmetic element 42.

The registers 44, 46 and 48 have a register file structure and each include a plurality of registers. Each of the registers 44, 46, and 48 of the register file structure is an example of the register unit. The registers 44, 46, and 48 may adopt a physical register method in which a register file and an update buffer for holding an operation result and the like until the register file is stored.

For example, the arithmetic processing device 102 includes 32 fixed point registers 44 of 64 bit configuration, 16 mask registers 46 of 64 bit configurations, and 32 floating point registers 48 of 512 bit configurations. The number and the bit configuration of each of the registers 44, 46, and 48 may be other than those described above. In addition, the bit configuration of the floating point register 48 may be variable.

For example, it is assumed that eight 64-bit data are stored in each of two floating point registers 48, and the SIMD operation of eight sets of data pieces between floating point registers 48 is performed. In this case, mask values are stored in the 0-th (the lowermost bit), 8-th, 16-th, 24-th, 32-nd, 40-th, 48-th, and 56-th bits of the mask register 46 referred to in the SIMD operation. The eight mask values correspond to eight sets of data for which SIMD operations are performed. In a case where the mask value is "1", the SIMD operation of the corresponding data is performed and in a case where the mask value is "0", execution of the corresponding SIMD operation is masked.

Further, it is assumed that 16 32-bit data are stored in two floating point registers 48 respectively, and SIMD operation of 16 sets of data between the registers 48 is performed. In this case, a mask value is stored for each of 4 bits from the 0-th (the lowest bit) bit of the mask register 46 referred to in SIMD operation. Similarly, in a case where 64 pieces of 8-bit data are stored in two floating point registers 48 and the SIMD operation of 64 sets of data pieces between the registers 48 is executed, the mask value is stored in each bit of the mask register 46 referred to in the SIMD operation.

The three floating point registers 48 are used in a case where a product-sum operation (SIMD operation) is performed. Even in a case where the operation is executed using three floating point registers 48, a using method of the mask register 46 is the same as a case of executing of the operations using two floating point registers 48.

In the SIMD operation, in order to improve the operation efficiency, it is preferable not to set a mask value(="0") for inhibiting the operation. Therefore, the mask value corresponding to each data set is often set to "1". In a case where the SIMD operations on all data sets is executed, all mask bits may be set to "1" by writing "1" to the corresponding mask register 46.

In consideration of the high frequency of performing SIMD operations on all data sets, in a command set architecture (ISA) used by the arithmetic processing device 102, an all "1" writing command (the specific value writing command) to write all "1" s in a predetermined mask register 46 is included. In this case, the specific value is all "1", and the command decoding unit 18 writes the identification information RINF in the register control unit 20 based on the decoding of the all "1" writing command.

FIG. 7 is a diagram illustrating an example of a command decoding unit 18 and a register control unit 20 of FIG. 6. The command decoding unit 18 includes four decode slots 182 (182a, 182b, 182c, and 182d) and an identification information management unit 186. The number of decode slots 182 is not limited to four as long as it is plural. Four decode slots 182 receive a command from the command buffer 16 in parallel, decode the received command in parallel, and issue a command to any of the reservation stations RSA 241, RSE 242, RSF 243, and RSBR 244 according to the decoding result. That is, the arithmetic processing device 102 is a superscalar processor capable of processing four commands in parallel.

The decode slots 182 each have a command determination unit 184 (184a, 184b, 184c, and 184d). Each command determination unit 184 determines whether the command from the command decoding unit 18 is a mask writing command for writing the specific value in the mask register 46. In a case where the command is a mask writing command for writing the specific value, each command determination unit 184 outputs the register number REGN identifying the mask register 46 to be written and the information indicating the specific value to the identification information management unit 186.

In addition, each command determination unit 184 determines whether the command from the command decoding unit 18 is a mask writing command for writing the specific value in the mask register 46. In a case where the command is a mask writing command for writing a value other than the specific value, each command determination unit 184 outputs the register number REGN identifying the mask register 46 to be written and the information indicating other than the specific value to the identification information management unit 186. Furthermore, in a case where the command is a mask writing command for writing the specific value or a value other than the specific value, each command determination unit 184 outputs information such as an address indicating the description order of the mask writing command on the program is stored in the identification information management unit 186.

Each command determination unit 184 determines whether the command from the command decoding unit 18 is a mask reading command for reading the specific value in the mask register 46. In a case where the command is the mask reading command, each command determination unit 184 outputs the register number REGN indicating the mask register 46 to be read to the register control unit 20. Each command determination unit 184 receives the flag information RFLG output from the register control unit 20 based on the output of the register number REGN, and outputs the flag information RFLG to the RSF 243 together with the mask reading command.

However, in the following case, each command determination unit 184 changes the flag information RFLG to the permission state (described later) and outputs the flag information RFLG to the RSF 243. For example, it is assumed that there is a mask writing command for writing a value which is not a specific value corresponding to the register number REGN decoded in another decode slot 182 prior to the description of the mask reading command corresponding to the register number REGN decoded in a certain decode slot 182. In this case, it is required to read a value that is not a specific value from the mask register 46 to be read based on the mask reading command. Therefore, the identification information management unit 186 collects the information items of the mask writing command for writing the value that is not the specific value from each command determination unit 184, and issues an instruction to change the flag information RFLG from the inhibition state (described later) to the permission state to the target decode slot 182 based on the collected information.

The identification information management unit 186 determines the identification information RINF (REGN, TGR) to be stored in the identification information holding unit 202 based on the information received in parallel from each decode slot 182. In a case where the register number REGN and the information indicating the specific value from are received from any one of the command determination units 184, the identification information management unit 186 outputs an instruction SET for setting the flag TGR and the register number REGN to the register control unit 20 as the identification information RINF.

In a case where the identification information management unit 186 receives the register number REGN and information indicating other than the specific value from any one of the command determination units 184, the identification information management unit 186 executes different operations according to the register number REGN held by the register control unit 20. In a case where the register number REGN received from the command determination unit 184 is the same as the register number REGN held in the register control unit 20, the identification information management unit 186 outputs the instruction RST to reset the flag TGR to the register control unit 20 as the identification information RINF (Reset operation). On the other hand, in a case where the register number REGN received from the command determination unit 184 is different from the register number REGN held in the register control unit 20, the identification information management unit 186 does not update the information (REGN, TGR) held in the register control unit 20 (non-operation).

In a case where the register number REGN and the information indicating the mask value are received from the plurality of command determination units 184, the identification information management unit 186 determines whether to execute the set operation or the reset operation corresponding to each mask writing command. The identification information management unit 186 executes the set operation or the reset operation based on the determination result, or inhibits the execution of the set operation and the reset operation. For example, the identification information management unit 186 executes the set operation or the reset operation corresponding to the mask writing command described last in the program among a plurality of mask writing commands to be subjected to the set operation or the reset operation. Accordingly, the number of accesses to the register control unit 20 by the identification information management unit 186 may be minimized, and an increase in power consumption accompanying the access to the register control unit 20 may be inhibited.

The register control unit 20 includes an identification information holding unit 202 that holds identification information RINF (flag TGR and register number REGN) and four match detection units 204 (204a, 204b, 204c, and 204d) corresponding to the four decode slots 182, respectively. The configuration and function of the identification information holding unit 202 are the same as the configuration and function of the identification information holding unit 3 illustrated in FIG. 1.

Figure 9:
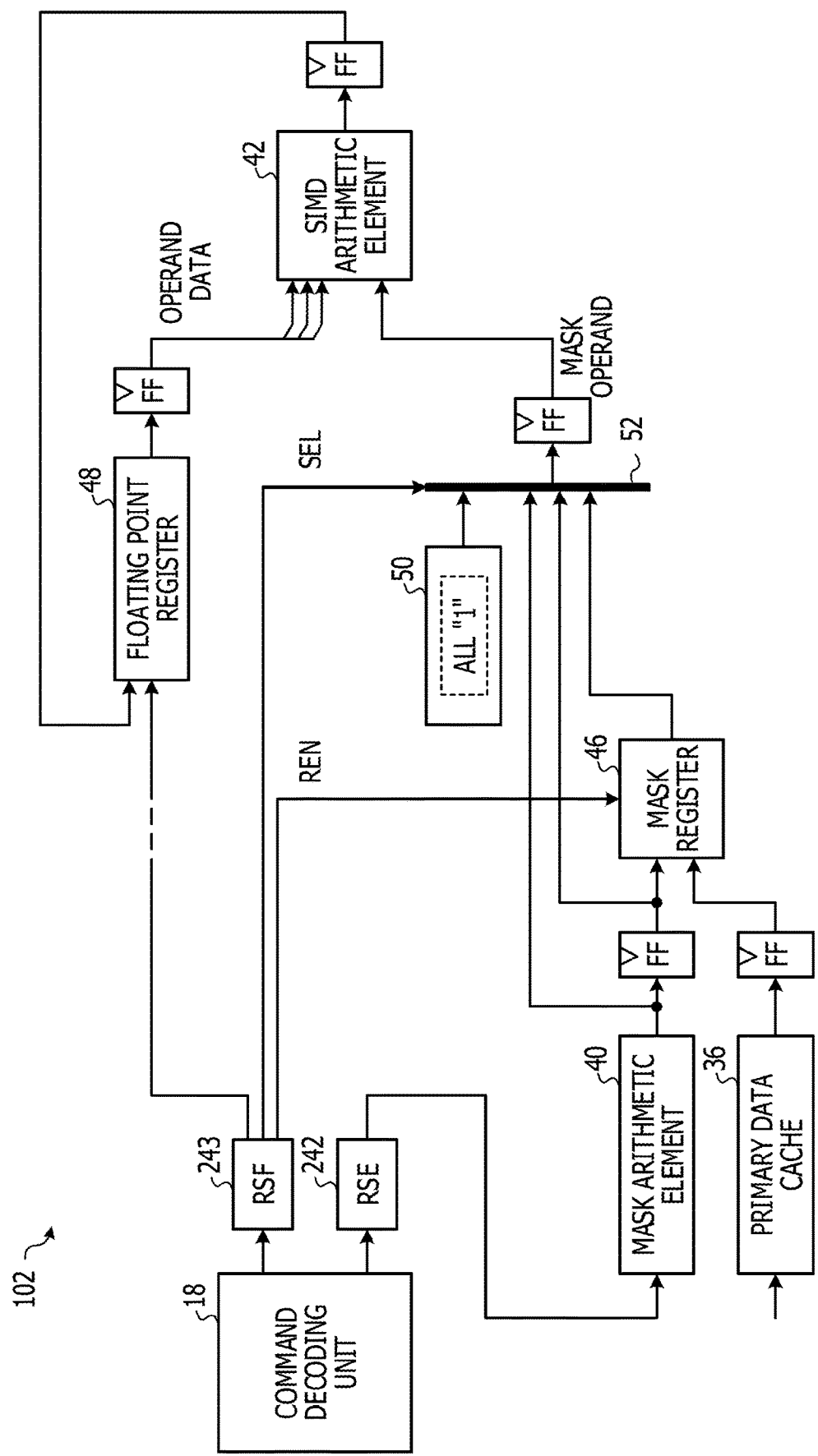
FIG. 9 is a diagram illustrating an example of a circuit that executes a mask writing command and a mask reading command in the arithmetic processing device of FIG. 6.

The register control unit 20 has a function to reset (invalidate) the flag TGR of the identification information holding unit 202 based on the clear signal CLR issued by the CSE 30. The CSE 30 issues a clear signal CLR to clear the processing in progress in the pipeline when the branch prediction by the branch prediction unit 22 is missed. As a result, it is possible to inhibit the problem that the identification information RINF set in the identification information holding unit 202 does not correspond to the mask value held by the mask register 46, and to inhibit the malfunction of the arithmetic processing device 102. Hereinafter, clearing a pipeline is also referred to as pipeline clearing. The clear signal CLR is an example of an instruction to cancel the execution of a command. An example of a pipeline is illustrated in FIG. 9.

In a case where each register number REGN received from the corresponding command determination unit 184 matches the register number REGN stored in the identification information holding unit 202, each match detection unit 204 outputs the flag information RFLG based on the value of the flag TGR held in the identification information holding unit 202. Each match detection unit 204 sets the flag information RFLG in the inhibition state in a case where the flag TGR is in the set state (high level) and sets the flag information RFLG in the permission state when the flag TGR is in the reset state (low level).

In addition, in a case where the register number REGN received from the corresponding command determination unit 184 does not match the register number REGN held in the identification information holding unit 202, each match detection unit 204 sets the flag information RFLG in the permission state. The flag information RFLG in the inhibition state corresponds to the inhibition information illustrated in FIG. 1 and the flag information RFLG in the permission state corresponds to the permission information illustrated in FIG. 1. Each match detection unit 204 is an example of a notification unit that notifies flag information RFLG indicating whether the register number REGN corresponds to the identification information RINF (REGN, TGR) held in the identification information holding unit 202 based on a query from decode slot 182. The flag information is an example of the correspondence information.

Even in a case where the identification information holding unit 202 is provided commonly to a plurality of decode slots 182 according to the configuration illustrated in FIG. 7, the correct flag TGR and the correct register number REGN may be held in the identification information holding unit 202 based on the mask writing command. Accordingly, it is possible to correctly determine whether to read the mask value from the mask register 46 based on the mask reading command.

In addition, in the configuration illustrated in FIG. 7, the identification information holding unit 202 common to a plurality of decode slots 182 is provided and the match detection unit 204 corresponding to each decode slot 182 outputs the flag information RFLG in response to an inquiry from each decode slot 182. Accordingly, each of the plurality of decode slots 182 may acquire the flag information RFLG without accessing the identification information RINF set in the identification information holding unit 202 and it is possible to improve the acquisition efficiency of the flag information RFLG.

Furthermore, with the configuration illustrated in FIG. 7, whether the mask writing command and the mask reading command are supplied from the command buffer 16 to which decode slot 182, the determination as to whether to read the mask value from the mask register 46 may be correctly performed. That is, an operation suitable for the superscalar system may be realized. In addition, since the match detection operation by a plurality of match detection units 204 may be executed in parallel, the detection time may be shortened compared to the case where the match detection operation is sequentially executed by one match detection unit 204. As a result, the timing at which the plurality of decode slots 182 issue a command to the RSF 243 may be aligned.

Figure 8:
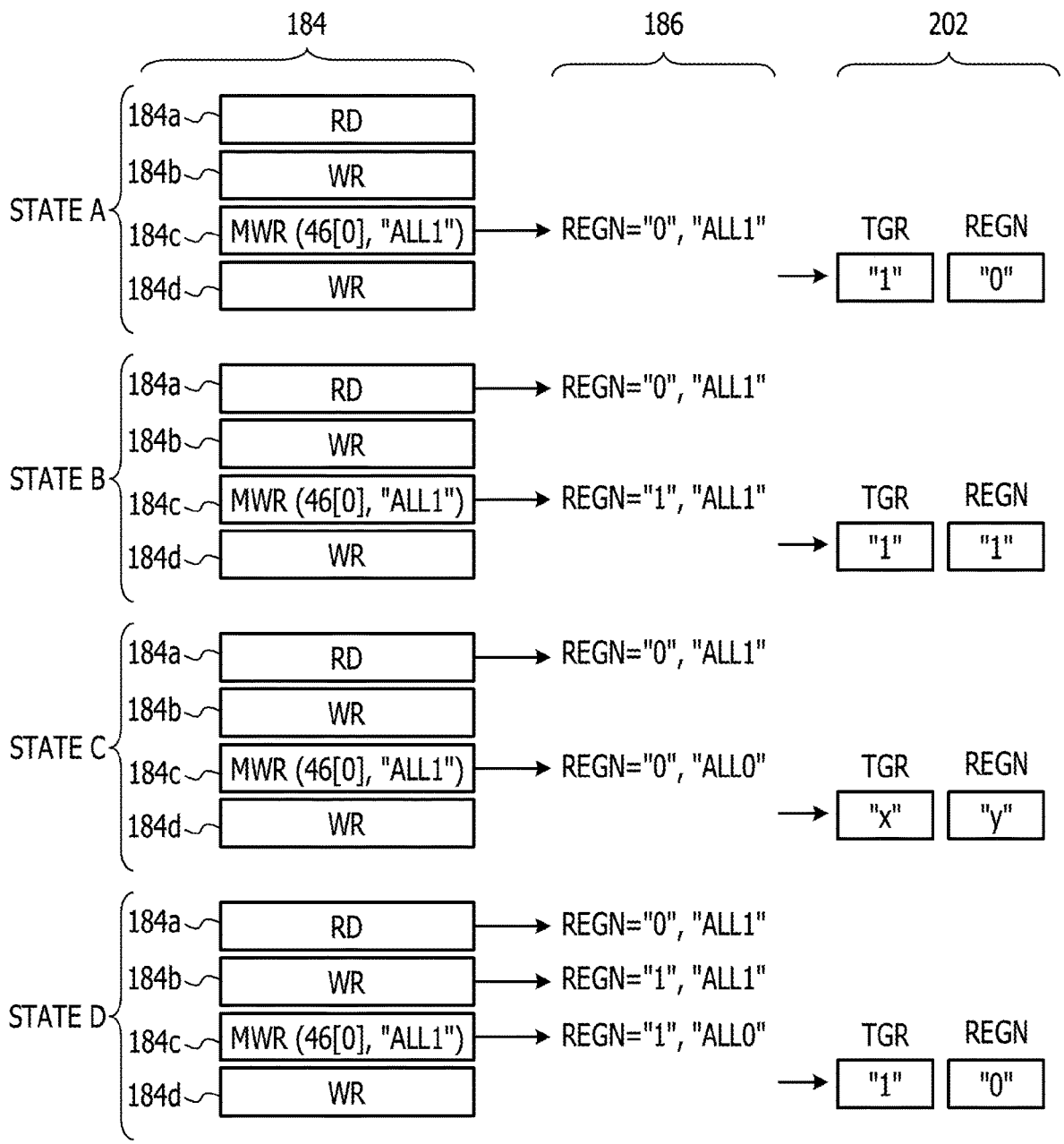
FIG. 8 is a diagram illustrating an example of operations of the command decoding unit illustrated in FIG. 7.

FIG. 8 is a diagram illustrating an example of operations of the command decoding unit 18 illustrated in FIG. 7. In FIG. 8, the symbol MWR indicates a mask writing command, and the symbols 46[0] and 46[1] indicate the mask register 46 in which the mask value is written. The symbol WR indicates a writing command other than the mask writing command and the symbol RD indicates a reading command. The reading command may be a mask reading command or a reading command other than the mask reading command.

The symbol ALL1 indicates that the mask value is all "1" (specific value), and the symbol ALL0 indicates that the mask value is a value other than all "1" (for example, all "0"). In order to make the description easy to understand, in each of (state A), (state B), (state C), and (state D), it is assumed that the arrangement order of the commands determined by the command determination units 184*a*, 184*b*, 184*c*, and 184*d* is the program description order. That is, commands are stored in the decode slots 182*a*, 182*b*, 182*c* and 182*d* in the order described in the program.

In the (state A), the command decoding unit 18 decodes one mask writing command MWR. The command determination unit 184*c* outputs the register number REGN="0" and the mask value="ALL1" to the identification information management unit 186 based on the decoding result. Since one mask writing command for writing all "1" in the mask register 46 is decoded, the identification information management unit 186 writes the register number REGN="0" received from the command determination unit 184*c* to the identification information holding unit 202 and sets the flag TGR to "1".

In (state B), the command decoding unit 18 decodes two mask writing commands MWR. The command determination unit 184*a* outputs the register number REGN="0" and the mask value="ALL1" to the identification information management unit 186 based on the decoding result. The command determination unit 184*c* outputs the register number REGN="1" and the mask value="ALL1" to the identification information management unit 186 based on the decoding result.

Since two mask writing commands to write all "1" s in different mask registers 46 are decoded, the identification information management unit 186 adopts a command whose execution order in the in-order is later. The identification information management unit 186 writes the register number REGN="1" received from the command determination unit 184*c* to the identification information holding unit 202 and sets the flag TGR to "1".

In the (state C), the command decoding unit 18 decodes two mask writing commands MWR. The command determination unit 184*a* outputs the register number REGN="0" and the mask value="ALL1" to the identification information management unit 186 based on the decoding result. The command determination unit 184*c* outputs the register number REGN="0" and the mask value="ALL0" to the identification information management unit 186 based on the decoding result.

Since two mask writing commands are written that sequentially write the mask values other than all "1" and all "1" to the same mask register 46, the identification information management unit 186 inhibits writing of information to the identification information holding unit 202. Therefore, the identification information holding unit 202 keeps holding the flag TGR="x" and the register number REGN="y" already held.

Therefore, in the (state C), it is possible to inhibit the rewriting of the flag TGR="x" to be originally effective and the register number REGN="y". As a result, for example, in the case of "x"="1" and in a case where the mask reading command for reading the mask value from the mask register 46 with the register number REGN="y" is subsequently issued, the mask value may be read without operating the mask register 46.

In the (state D), the command decoding unit 18 decodes three mask writing commands MWR. The command determination unit 184*a* outputs the register number REGN="0" and the mask value="ALL1" to the identification information management unit 186 based on the decoding result. The command determination unit 184*b* outputs the register number REGN="1" and the mask value="ALL1" to the identification information management unit 186 based on the decoding result. The command determination unit 184*c* outputs the register number REGN="1" and the mask value="ALL0" to the identification information management unit 186 based on the decoding result.

In the (state D), after all "1" is written in the mask register 46[1] by the second mask writing command, a mask value other than all "1" is written to the mask register 46[1] by the third mask writing command. Therefore, the identification information management unit 186 inhibits writing of information to the identification information holding unit 202 for a mask writing command for the mask register 46[1], as in the (state C). The identification information management unit 186 writes the register number REGN="0" received from the command determination unit 184*a* to the identification information holding unit 202 and sets the flag TGR to "1".

Therefore, in the (state D), it is possible to hold the flag TGR="1" to be originally effective and the register number REGN="0" to the identification information holding unit 202. As a result, for example, and in a case where the mask reading command for reading the mask value from the mask register 46 with the register number REGN="0" is subsequently issued, the mask value may be read without operating the mask register 46.

As described above, the identification information management unit 186 determines the information to be written in the identification information holding unit 202 based on the determination results of the four command determination units 184 and the execution order of the commands in order. Therefore, in the superscalar arithmetic processing device 102, similar to the scalar arithmetic processing device that decodes commands sequentially, the identification information RINF may be held in the identification information holding unit 202, and it may be determined whether the operation of the mask register 46 may be inhibited or permitted.

In a case where the command decoding unit 18 decodes a plurality of mask reading commands in parallel, each command determination unit 184 executes an inquiry to notify the match detection unit 204 of the flag information RFLG. Each command determination unit 184 issues the flag information RFLG received from each match detection unit 204 to the RSF 243 together with the mask reading command.

FIG. 9 is a diagram illustrating an example of a circuit that executes a mask writing command and a mask reading command in the arithmetic processing device 102 illustrated in FIG. 6. In FIG. 9, a rectangle with "FF" indicates a flip flop, and each flip flop FF indicates a boundary of stages in pipeline processing divided into a plurality of stages. In addition to the flip-flops FF illustrated in FIG. 9, there are flip-flops FF that indicate the boundaries of the stages, but illustration is omitted.

For example, as stages of the pipeline, there are a decoding stage, a decode transfer stage, a priority stage, a priority transfer stage, a buffer stage, an execution stage and a write back stage. In the decoding stage, the command decoding unit 1 decodes the command. In the decode transfer stage, the command decoded by the command decoding unit 1 is issued to the RSE 242, the RSF 243, and the like. In the priority stage, for example, the RSF 243 determines a command to be issued to the arithmetic element 42.

For example, the mask writing command is issued from the RSF 243 to the arithmetic element 42 as an arithmetic command. In the buffer stage, an operand used for the operation is read from the register 48 or the like. In the execution stage, the arithmetic element 42 executes an operation. In the write back stage, the result of the operation by the arithmetic element 42 is stored in the register 48 or the like.

For example, the mask writing command is issued from the RSE 242 to the arithmetic element 40 as an arithmetic command. In addition, the mask writing command may be a load command for transferring the mask value held in the primary data cache 36 to the mask register 46. The arithmetic element 40 may be provided exclusively for mask register 46 in order to calculate a mask value to be written to mask register 46. Hereinafter, the arithmetic element 40 is also referred to as a mask arithmetic element 40.

As described with reference to FIG. 6, the mask arithmetic element 40 executes a logical operation or arithmetic operation based on the arithmetic command, and generates a mask value other than the specific value to be written to the mask register 46 as the operation result. It is assumed that the specific value is not calculated in the operation executed by the mask arithmetic element 40 based on the mask writing command for writing the mask value other than the specific value. Then, based on the mask writing command decoded by the command decoding unit 18, a mask value or a specific value other than the specific value is written to the mask register 46.

The specific value is preferably set to a mask value that is read more frequently than other mask values read from the mask register 46, in order to increase the reduction effect of the power consumption of the arithmetic processing device 102. As described above, in the SIMD arithmetic command, when it is assumed that the frequency of setting the mask value to all "1" is the highest, a command dedicated to writing all "1" in the mask register 46 is prepared. As a result, the reading of all "1"s from the mask register 46 may be inhibited, and power consumption may be reduced. The specific value may be other than all "1".

On the other hand, a mask reading command for reading the mask value held in the mask register 46 is issued from the RSF 243 to the arithmetic element 42. The mask reading command is assumed to be a SIMD arithmetic command for executing the SIMD operation in the arithmetic element 42. Since the processing executed by the SIMD arithmetic command reads the mask value from the mask register 46 and outputs it as the mask operand to the arithmetic element 42, the SIMD arithmetic command may also be said to be a mask reading command. Hereinafter, the arithmetic element 42 that executes the SIMD arithmetic command is also referred to as a SIMD arithmetic element 42.

The RSF 243 executes control to cause the floating point register 48 to output operand data (that is, data to be operated on) to be used for SIMD operation based on a mask reading command received from the command decoding unit 18. The operand data output from the floating point register 48 is held in the flip flop FF connected to the input of the SIMD arithmetic element 42.

In a case where the flag information RFLG attached to the mask reading command received from the command decoding unit 18 indicates the inhibition state, the RSF 243 outputs the read enable signal REN indicating the invalid state to the mask register 46 (register file). The read enable signal REN indicating an invalid state is generated when the mask register 46 to be read holds all "1" s (that is, a specific value).

The RSF 243 may output an address (register number REGN or the like) indicating the mask register 46 to be read to the mask register 46 (register file) together with the read enable signal REN indicating an invalid state. In this case, for example, the RSF 243 holds the address output to the mask register 46 (register file) without changing from a logic of the address output in the previous register access cycle. Accordingly, charging and discharging of the address line transmitting the address may be inhibited and the power consumption of the arithmetic processing device 102 may be further reduced.

The setting unit 50 and the selector 52 correspond to the setting unit 6 and the selector 7 illustrated in FIG. 1, respectively. In the setting unit 50, all "1" (specific value) is set in advance. The selector 52 is provided on a path for bypassing the calculation result of the mask arithmetic element 40 to the SIMD arithmetic element 42 and the like without passing the calculation result to the mask register 46. The selector 52 may select the output of the mask arithmetic element 40 and the output of the flip flop FF connected to the output of the mask arithmetic element 40. In the normal operation where the specific value is not selected, which path the selector 52 selects is determined based on the timing of the operation being executed ahead of time and the timing of an operation using the data selected by the selector 52 as operand data.

In a case where the flag information RFLG indicates the inhibition state, the RSF 243 outputs a selection signal SEL that causes the selector 52 to select the output of the setting unit 50 instead of the output of the mask register 46. Accordingly, all "1"s may be output to the SIMD arithmetic element 42 without operating the mask register 46 (register file) and the power consumption of the arithmetic processing device 102 may be reduced as compared with the case of reading all "1"s from the mask register 46. In FIG. 9, since the specific value set in the setting unit 50 may be selected as a mask operand using the selector 52 used for bypass control, an increase in circuit scale may be inhibited. The RSF 243 and the selector 52 are an example of an operation control unit.

On the other hand, in a case where the flag information RFLG attached to the mask reading command received from the command decoding unit 18 indicates the permission state, the RSF 243 outputs the read enable signal REN indicating the valid state to the mask register 46 (register file). The read enable signal REN indicating a valid state is generated when the mask register 46 to be read holds a mask value other than all "1"s. The RSF 243 outputs an address (register number REGN or the like) indicating the mask register 46 to be read to the mask register 46 (register file) together with the read enable signal REN indicating a valid state.

In addition, in a case where the flag information RFLG indicates the permission state, the RSF 243 outputs a selection signal SEL that causes the selector 52 to select the output of the mask register 46. Accordingly, the mask value may be read from the mask register 46 (register file), and the read mask value may be output to the SIMD arithmetic element 42.

The mask reading command may be a store command for writing the mask value held in the mask register 46 to the primary data cache. Also in the store command, in a case where the flag information RFLG attached to the store command is in the inhibition state, the mask register 46 is not read and accessed, and the selector selects all "1" and outputs it to the SIMD arithmetic element 42.

Figure 10:
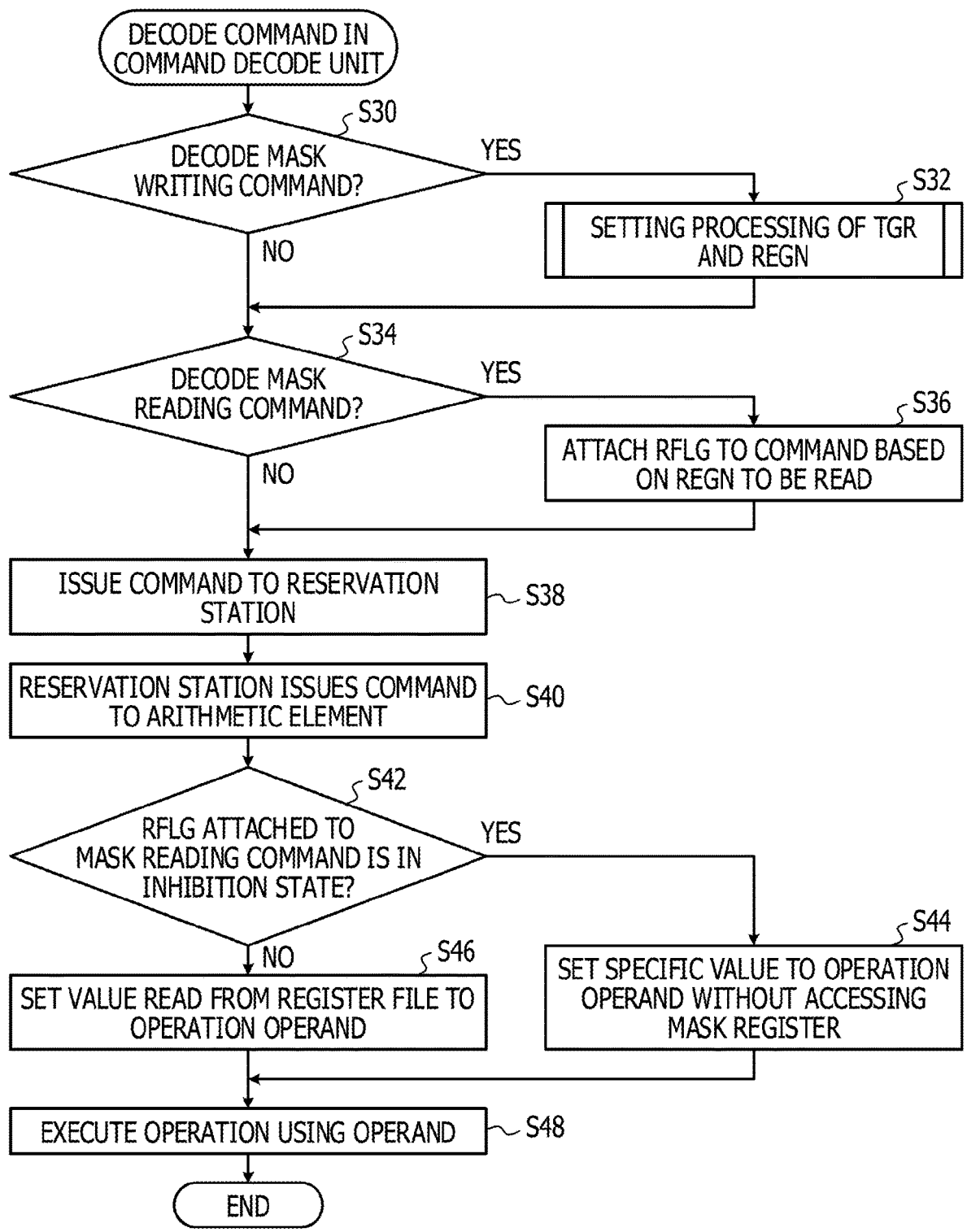
FIG. 10 is a diagram illustrating an example of operation flows of the arithmetic processing device illustrated in FIG. 6.

FIG. 10 is a diagram illustrating an example of operation flows of the arithmetic processing device 102 illustrated in FIG. 6. That is, FIG. 10 illustrates an example of a method for controlling the arithmetic processing device 102. The operation flow illustrated in FIG. 10 is started based on the fact that the command decoding unit 18 is decoded a command.

First, in step S30, the command decoding unit 18 determines whether the mask writing command is decoded. In a case where the mask writing command is decoded, the operation proceeds to step S32 and in a case where the mask writing command is not decoded, the operation proceeds to step S34.

Figure 11:
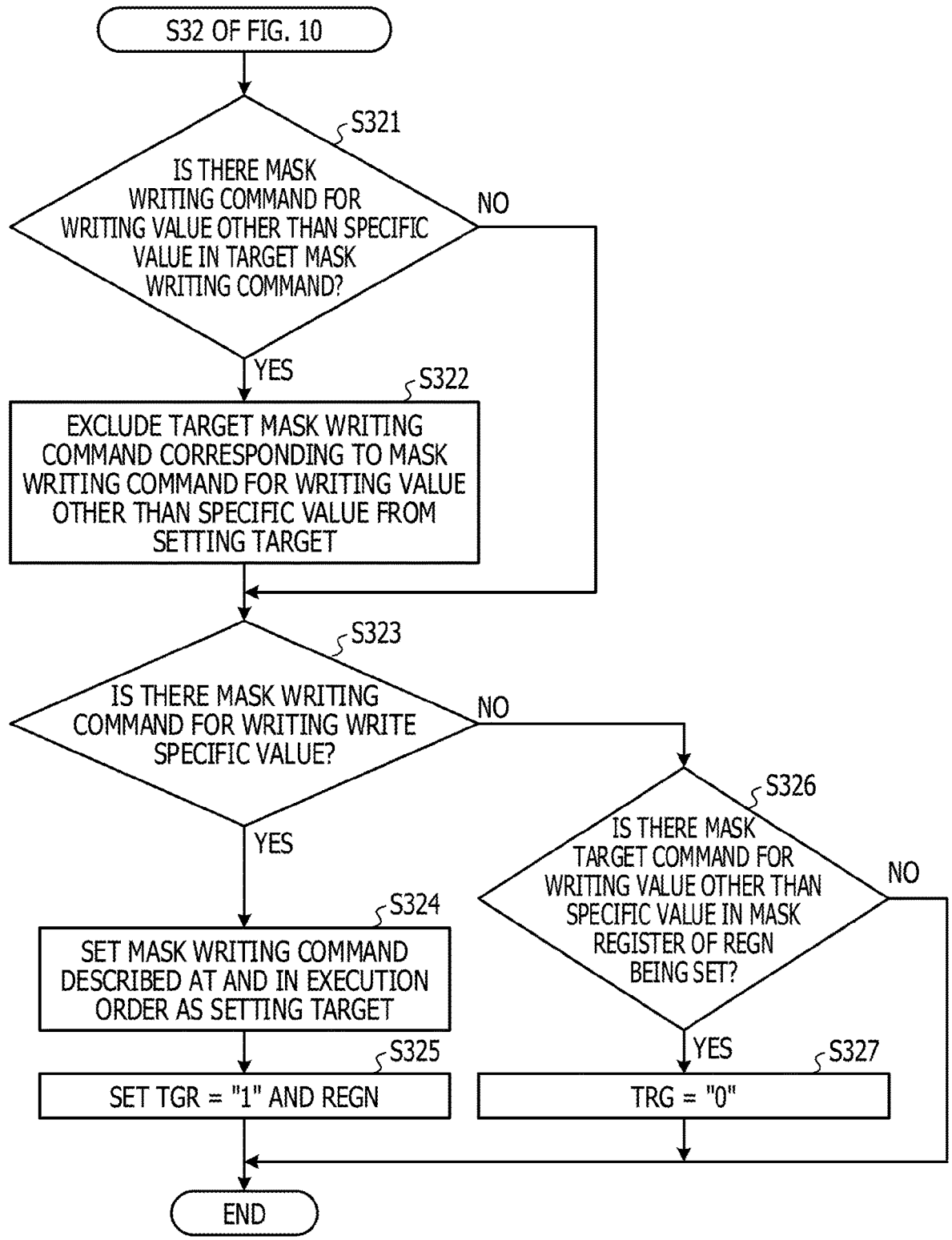
FIG. 11 is a diagram illustrating an example of an operation flow of step S32 of FIG. 10.

In step S32, the command decoding unit 18 executes processing of setting the flag TGR and the register number REGN in the identification information holding unit 202, and proceeds to the operation to step S34. An example of the processing of step S32 is illustrated in FIG. 11.

In step S34, the command decoding unit 18 determines whether the mask reading command is decoded. In a case where the mask reading command is decoded, the operation proceeds to step S36 and in a case where the mask reading command is not decoded, the operation proceeds to step S38. The order of steps S30 and S34 may be reversed.

In step S36, the command decoding unit 18 notifies the register control unit 20 of the register number REGN of the mask register 46 to be read according to the decoded mask reading command, and receives the flag information RFLG from the register control unit 20. The command decoding unit 18 adds the received flag information RFLG to the mask reading command and proceeds to the operation to step S38.

In a case where the plurality of decode slots 182 respectively decode the mask reading command, the operation of step S36 is executed for each mask reading command. In a case where the register number REGN from the command decoding unit 18 matches the register number REGN held in the identification information holding unit 202 and the flag TGR is set, the register control unit 20 outputs flag information RFLG indicating the inhibition state to the command decoding unit 18. In a case where the register number REGN does not match the register number REGN held in the identification information holding unit 202, the register control unit 20 outputs flag information RFLG indicating the permission state to the command decoding unit 18.

In step S38, the command decoding unit 18 issues the decoded command to any of the RSA 241, RSE 242, RSF 243, and RSBR 244, which is the target of command processing. Next, in step S40, the RSA 241, RSE 242, RSF 243, and RSBR 244, which have received the command, the issue the command to any of the arithmetic elements 38, 40, and 42 or the operand address generation unit 34 which are the execution targets of the command.

Next, in step S42, the RSF 243 determines whether or not the flag information RFLG attached to the mask reading command indicates the inhibition state. In a case where the flag information RFLG indicates the inhibition state, the operation proceeds to step S44 and in a case where the flag information RFLG indicates the permission state, the operation proceeds to step S46.

In step S44, the RSF 243 sets the read enable signal REN to an invalid level (for example, low level) based on the flag information RFLG in the inhibition state and sets the selection signal SEL to a value that selects a specific value as an operand of the operation. That is, the selector 52 selects the output of the setting unit 50. Accordingly, the access operation of the mask register 46 is inhibited, and the power consumption is inhibited. That is, the RSF 243 and the selector 52 inhibit the read access of the mask register 46 and execute the inhibiting operation of selecting the specific value set in the setting unit 50. After step S44, the operation is shifted to step S48.

In step S46, the RSF 243 sets the read enable signal REN to a valid level (for example, high level) based on the flag information RFLG in the permission state. In addition, the RSF 243 sets the selection signal SEL to a value that selects the mask value read from the mask register 46 as an operation operand. Accordingly, the mask value held in the mask register 46 is read. That is, the RSF 243 and the selector 52 permits the read access of the mask register 46 and execute the permission operation of not selecting the specific value set in the setting unit 50. After step S46, the operation proceeds to step S48.

In step S48, the arithmetic elements 38, 40, and 42 having received the arithmetic command execute the operation using the operands read from the various registers 44, 46, and 48. Alternatively, the operand address generation unit 34 that has received the memory access command accesses the primary data cache. The operation illustrated in FIG. 10 ends.

FIG. 11 illustrates an example of an operation flow of step S32 of FIG. 10. The operation flow of FIG. 11 is executed by the identification information management unit 186. First, in step S321, the identification information management unit 186 determines whether there is a mask writing command for writing a mask value other than the specific value in the target mask register 46 among the commands executed after the specific value writing command. Here, the command to be determined is a command decoded in parallel (for example, simultaneously) by a plurality of decode slots 182, and the order of execution of the commands is determined in the order of program description (in order).

In a case where there is a mask writing command for writing a mask value other than the specific value in the target mask register 46, the operation proceeds to step S322. In a case where there is no mask writing command for writing a mask value other than the specific value in the target mask register 46, the specific value writing command for writing the specific value to the target mask register 46 is set as a temporary setting target, and the operation proceeds to step S323. Here, the temporary setting target indicates that identification information RINF (TGR="1", REGN) may be set in the identification information holding unit 202.

In step S322, the identification information management unit 186 excludes a specific value writing command for writing a specific value before the mask value other than the specific value is written to the target mask register 46 from the temporary setting target, the processing proceeds to step S323.

In step S323, the identification information management unit 186 determines whether there is a specific value writing command for writing the specific value (all "1"). Hereinafter, the mask register 46 in which the specific value is written by the specific value writing command is also referred to as a target mask register 46. In a case where there is the specific value writing command, the operation proceeds to step S324 and in a case where the specific value writing command is not decoded, the operation proceeds to step S326. In a case where at least one of the plurality of decode slots 182 has decoded the specific value writing command, the operation proceeds to step S324.

In step S324, the identification information management unit 186 sets the mask writing command described at the end of the program among the temporary setting target mask writing commands as a true setting target. Next, in step S325, the identification information management unit 186 stores the register number REGN of the mask register 46 to which the specific value is written in accordance with the mask writing command set as the true setting target in step S324 in the identification information holding unit 202. In addition, the identification information management unit 186 sets the flag TGR of the identification information holding unit 202 to "1", and ends the operation.

On the other hand, in step S326, the identification information management unit 186 determines whether there is a mask writing command for writing a mask value other than the specific value in the target mask register 46 indicated by the register number REGN being set in the identification information holding unit 202. In a case where there is the mask writing command for writing a mask value other than the specific value, the operation proceeds to step S327 and in a case where there is no mask writing command for writing the mask value other than the specific value, the operation ends. In step S327, the identification information management unit 186 resets the flag TGR of the identification information holding unit 202 to "0", and ends the operation.

As described above, also in the embodiments illustrated in FIGS. 6 to 11, similar to the embodiments illustrated in FIGS. 1 to 5, the operation may be performed using a specific value without accessing the mask register 46 based on a mask reading command for reading the specific value from the mask register 46. As a result, the power consumption of the arithmetic processing device 102 in execution of the command may be reduced compared with a case where the specific value is readout by accessing the mask register 46. Even in a case where the identification information RINF held in the identification information holding unit 202 is shared by the plurality of mask registers 46, it is possible to output a correct value to the arithmetic element 42 while reducing the power consumption.

Furthermore, in the embodiment illustrated in FIGS. 6 to 11, in a case where the identification information holding unit 202 is provided commonly to a plurality of decode slots 182, the correct flag TGR and the correct register number REGN may be held in the identification information holding unit 202. Accordingly, it is possible to correctly determine whether to read the mask value from the mask register 46 based on the mask reading command. In addition, whether the mask writing command and the mask reading command are supplied to which decode slot 182, the determination as to whether to read the mask value from the mask register 46 may be correctly performed.

By executing the operation illustrated in FIG. 11 by the identification information management unit 186, even in a case where the plurality of decode slots 182 decode a plurality of commands in parallel, similar to the case of sequentially decoding a plurality of commands, the correct identification information RINF may be set in the identification information holding unit 202.

By resetting the flag TGR of the identification information holding unit 202 in a case where the branch prediction by the branch prediction unit 22 deviates, it is possible to inhibit the problem that the identification information RINF set in the identification information holding unit 202 does not correspond to the mask value held by the mask register 46. Accordingly, the malfunction of the arithmetic processing device 102 may be inhibited.

By providing the match detection unit 204 for each decode slot 182, each of the plurality of decode slots 182 may acquire the flag information RFLG without accessing the identification information RINF set in the identification information holding unit 202. Since the specific value set in the setting unit 50 may be selected as a mask operand using the selector 52 used for bypass control, an increase in circuit scale may be inhibited.

Figure 12:
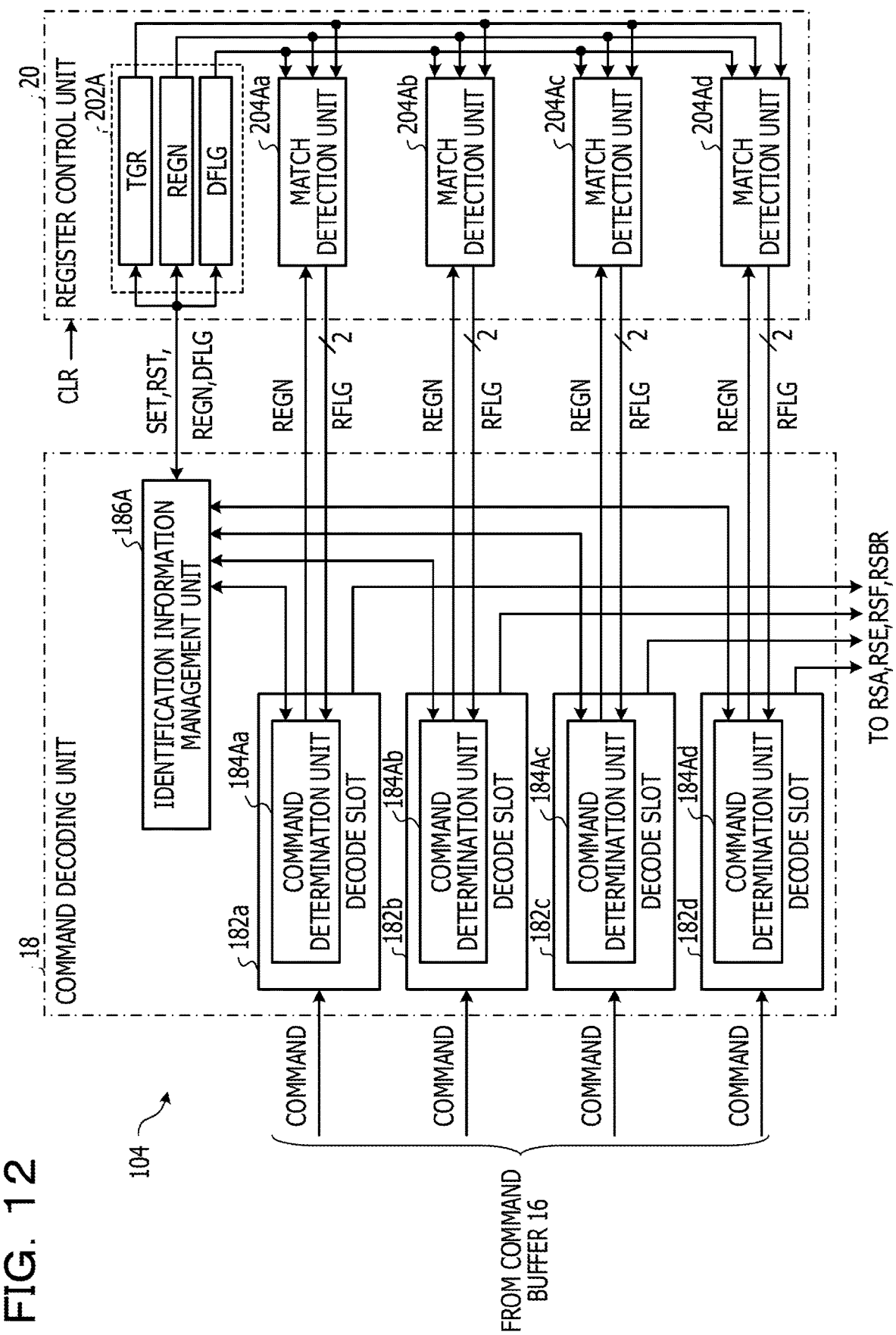
FIG. 12 is a diagram illustrating an example of a command decoding unit and a register control unit in an arithmetic processing device of another embodiment.

FIG. 12 illustrates an example of a command decoding unit and a register control unit in the arithmetic processing device of another embodiment. Elements that are the same as or similar to the elements described in FIG. 7 are given the same reference numerals, and detailed descriptions thereof will be omitted. An arithmetic processing device 104 illustrated in FIG. 12 is, for example, a superscalar processor. The arithmetic processing device 104 may be a processor of another type such as scalar processor. In addition, the information processing system including the arithmetic processing device 104 has the same configuration as that of FIG. 5 and is realized by replacing the reference numeral of CPU of FIGS. 5 to 104.

In this embodiment, a plurality of specific values (for example, two all "1"s and all "0") may be specified as the specific mask values to be written to the mask register 46. In addition, a plurality of specific value writing commands to write specific values in the mask register 46 are prepared in the command set corresponding to the plurality of specific values. For example, it is assumed that all "1"s is the mask value set most frequently in the mask register 46, and all "0"s is the mask value set second in the mask register 46.

In the arithmetic processing device 104 illustrated in FIG. 12, the command decoding unit 18 includes command determination unit 184A (184Aa, 184Ab, 184Ac, and 184Ad) instead of the command determination unit 184 (184*a*, 184*b*, 184*c*, and 184*d*) illustrated in FIG. 7. In addition, the command decoding unit 18 includes an identification information management unit 186A instead of the identification information management unit 186 illustrated in FIG. 7. The configuration and functions of the command decoding unit 18 excluding the command determination unit 184A and the identification information management unit 186A are the same as those of the command decoding unit 18 illustrated in FIG. 7.

The register control unit 20 includes an identification information holding unit 202A instead of the identification information holding unit 202 illustrated in FIG. 7. In addition, the register control unit 20 includes a match detection unit 204A (204Aa, 204Ab, 204Ac, and 204Ad) instead of the match detection unit 204 (204*a*, 204*b*, 204*c*, and 204*d*) illustrated in FIG. 7. The configuration and the function of the register control unit 20 are the same as that of the identification information holding unit 202 illustrated in FIG. 7 except the identification information holding unit 202A and the match detection unit 204A. The identification information holding unit 202A has an area for holding the data flag DFLG in addition to the flag TGR and the register number REGN held by the identification information holding unit 202 illustrated in FIG. 7.

In a case where the decode slot 182 decodes a mask writing command dedicated to write all "1" in the mask register 46, the each command determination unit 184A outputs the mask value, the register number REGN, and information indicating the order of description in the program to the identification information management unit 186A. In a case where the decode slot 182 decodes a mask writing command dedicated to write all "0" in the mask register 46, the each command determination unit 184A outputs the mask value, the register number REGN, and information indicating the order of description in the program to the identification information management unit 186A.

When receiving the mask value and the register number REGN from any one of the command determination unit 184A, the identification information management unit 186A sends the received register number REGN and the data flag DFLG indicating the mask value to the identification information holding unit 202A. In addition, the identification information management unit 186A sets the flag TGR of the identification information holding unit 202A. The data flag DFLG is an example of specific value identification information that identifies the specific value.

When receiving the mask value and the register number REGN from the plurality of command determination units 184A, the identification information management unit 186A determines a mask writing command to be set as a true setting. The identification information management unit 186A stores, in the identification information holding unit 202A, the register number REGN corresponding to the mask writing command for which the setting is true and the data flag DFLG indicating the mask value. In addition, the identification information management unit 186A sets the flag TGR of the identification information holding unit 202A. The other functions of the identification information management unit 186A are the same as those of the identification information management unit 186 illustrated in FIG. 7.

In addition, similar to the command determination unit 184 illustrated in FIG. 7, in a case where the decoded command is the mask reading command, each command determination unit 184A outputs the register number REGN indicating the mask register 46 to be read to the register control unit 20. However, each command determination unit 184 receives 2-bit flag information RFLG output from the register control unit 20 based on the output of the register number REGN. Each command determination unit 184A outputs the flag information RFLG received from the register control unit 20 to the RSF 243 in association with the mask reading command.

However, in the following case, each command determination unit 184A changes the flag information RFLG to the permission state (described later) and outputs the flag information RFLG to the RSF 243. For example, it is assumed that there is a mask writing command for writing a value which is not a specific value corresponding to the register number REGN decoded in another decode slot 182 prior to the description of the mask reading command corresponding to the register number REGN decoded in a certain decode slot 182. In this case, it is required to read a value that is not a specific value from the mask register 46 to be read based on the mask reading command. Therefore, the identification information management unit 186A collects the information items of the mask writing command for writing the value that is not the specific value from each command determination unit 184A, and issues an instruction to change the flag information RFLG from the inhibition state (described later) to the permission state to the target decode slot 182 based on the collected information.

For example, flag information RFLG for "00" in the binary number indicates that the read target mask register 46 holds all "0" (specific value). Flag information RFLG for "01" in the binary number indicates that the read target mask register 46 holds all "1" (specific value). Flag information RFLG of "10" in binary notation indicates that the mask register 46 to be read holds a mask value other than the specific value. The flag information RFLG of "00" or "01" in binary notation indicates an inhibition state in which the reading of the specific value from the mask register 46 to be read is inhibited. The flag information RFLG of "10" in binary notation indicates a permission state in which the reading of the specific value from the mask register 46 to be read is permitted.

Each match detection unit 204A operates based on the identification information RINF (flag TGR, register number REGN, and data flag DFLG) held by the identification information holding unit 202A. In a case where the register number REGN received from the corresponding command determination unit 184A matches the register number REGN held in the identification information holding unit 202, each match detection unit 204A refers to the identification information holding unit 202. Each match detection unit 204A outputs flag information RFLG based on the value of the flag TGR and the value of the data flag DFLG held in the identification information holding unit 202.

When the flag TGR is in the set state (high level), each match detection unit 204 outputs the flag information FLG ("00" or "01" in binary; inhibition state) corresponding to the mask value indicated by the data flag DFLG. When the flag TGR is in the reset state (low level), each match detection unit 204A outputs the flag information RFLG indicating "10" (permission state) in binary. In addition, in a case where the register number REGN received from the corresponding command determination unit 184A does not match the register number REGN held in the identification information holding unit 202, each match detection unit 204A indicating "10" (permission state) in binary outputs the flag information RFLG.

Figure 13:
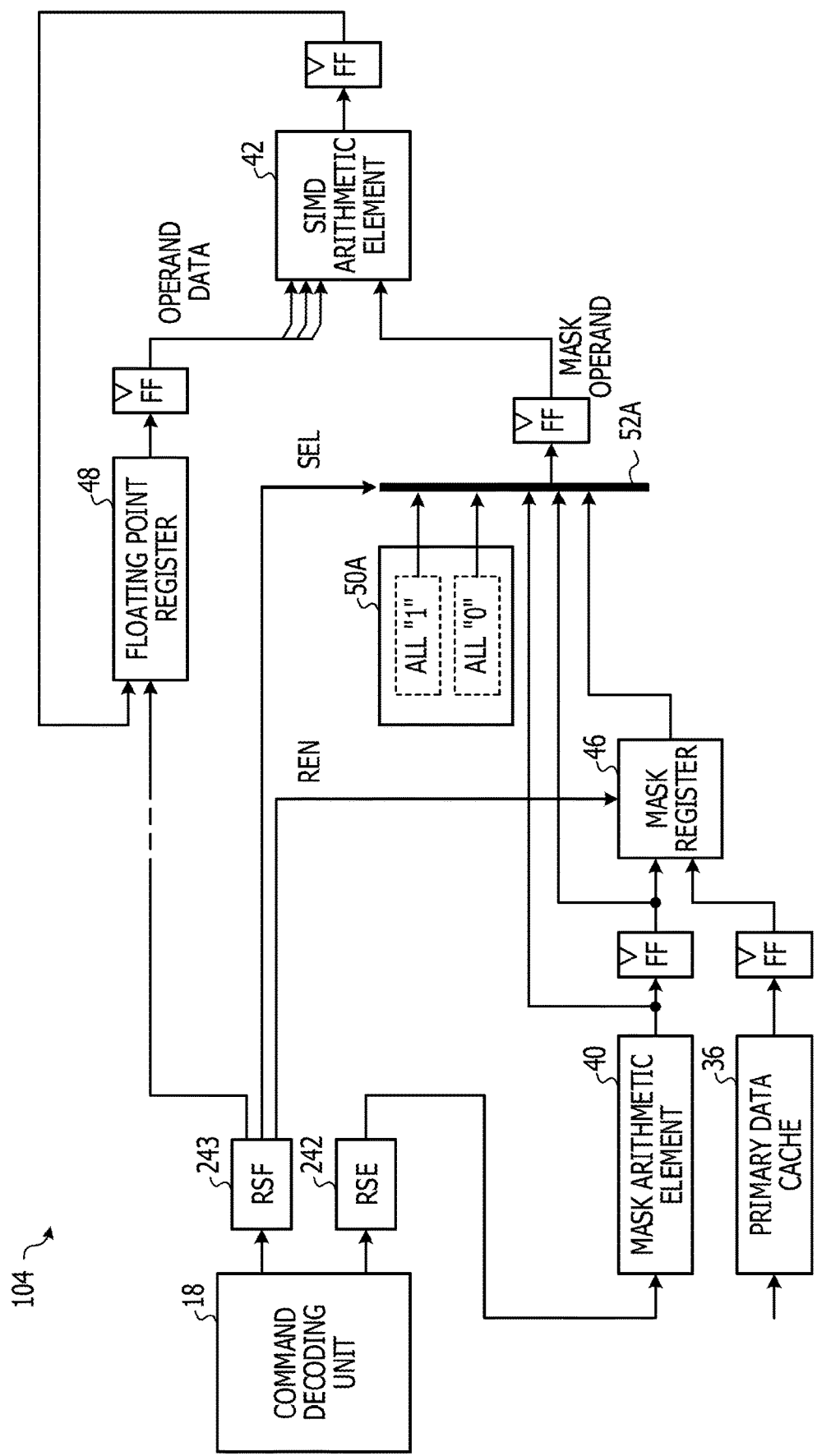
FIG. 13 is a diagram illustrating an example of a circuit that executes a mask writing command and a mask reading command in the arithmetic processing device of FIG. 12.

According to the configuration illustrated in FIG. 12, the flag information RFLG corresponding to each of two specific values (mask values) may be attached to a mask reading command. Accordingly, as illustrated in FIG. 13, in a case where the mask register 46 holds one of two specific values, it is possible to output the specific value as a mask operand to the arithmetic element 42 without operating the mask register 46. In the example illustrated in FIG. 12, an example is illustrated in which the operation of the mask register 46 is inhibited when reading out two specific values. However, the specific value set in the mask register 46 may be three or more. A dedicated mask writing command is prepared in advance for each specific value.

When the operation illustrated in FIG. 8 is replaced with the operation of the command determination unit 184A, the identification information management unit 186A, and the identification information holding unit 202A, in (state A) and (state B), the identification information holding unit 202A holds a data flag DFLG indicating "ALL1".

In the arithmetic processing device 104, when the mask register 46 holds the mask value of "ALL1" or "ALL0", the read operation of the mask register 46 based on the mask reading command is suppressed. Therefore, in the (state C), the identification information management unit 186A writes the flag TGR="1", the register number REGN="0", and the data flag DFLG indicating "ALL0" in the identification information holding unit 202A.

In the (state C), it is assumed that the command determination unit 184Ac corresponding to the command determination unit 184c decodes a mask writing command for writing a mask value (that is a mask value other than the specific value) other than "ALL0" and "ALL1" in the mask register 46. Therefore, the identification information management unit 186A writes the flag TGR="1", the register number REGN="0", and the data flag DFLG indicating "ALL1" in the identification information holding unit 202A. In the (state D), the identification information management unit 186A writes the flag TGR="1", the register number REGN="1", and the data flag DFLG indicating "ALL0" in the identification information holding unit 202A.

FIG. 13 is a diagram illustrating an example of a circuit that executes a mask writing command and a mask reading command in the arithmetic processing device 104 illustrated in FIG. 12. Elements that are the same as or similar to the elements described in FIG. 9 are given the same reference numerals, and detailed descriptions thereof will be omitted.

In FIG. 13, the setting unit 50A is provided instead of the setting unit 50 of FIG. 9 and the configuration of FIG. 13 is similar to the configuration illustrated in FIG. 9 except that selector 52A is provided instead of the selector 52 of FIG. 9. The two specific values (all "1" and all "0") are set in the setting unit 50A. In a case where three or more types of specific values are used, each specific value is set in the setting unit 50A.

The selector 52A has a function of selecting all "0" from the setting unit 50A based on the selection signal SEL, in addition to the function of the selector 52 illustrated in FIG. 9. Therefore, the RSF 243 outputs the selection signal SEL for causing the selector 52A to select the all "1" or all "0" set in the setting unit 50A to the selector 52A based on the flag information RFLG accompanying the mask reading command received from the command decoding unit 18. The RSF243 and the selector 52A are an example of an operation control unit.

The operation of the arithmetic processing device 104 illustrated in FIG. 12 is shown by the operation flow illustrated in FIG. 10. However, in FIG. 11 illustrating an example of step S32 of FIG. 10, the specific value is read as all "1" or all "0", and values other than the specific value may be read as values other than all "1" and all "0". Therefore, even when the plurality of mask registers 46 respectively hold a plurality of types of specific values, a plurality of types of specific values corresponding to the data flag DFLG held in the identification information holding unit 202A may be selected from the setting unit 50A based on the register reading command. Therefore, the reading of the specific value from mask register 46 that holds any of a plurality of specific values may be suppressed and the power consumption of the arithmetic processing device 104 at the time of execution of the command may be reduced compared to the case of reading a specific value from the mask register 46.

Thus, also according to the embodiment described with reference to FIGS. 12 and 13, the same effect as that of the embodiment illustrated in FIGS. 1 to 5 may be obtained. Furthermore, in the embodiments illustrated in FIG. 12 and FIG. 13, reading of a specific value from the mask register 46 that holds any of a plurality of specific values may be inhibited. As a result, even in a case where the mask register 46 holds any of a plurality of specific values, it is possible to supply the specific value to the arithmetic element 42 as an operand without accessing the mask register 46 and power consumption of the arithmetic processing device 104 at the time of execution of a command may be reduced.

Figure 14:
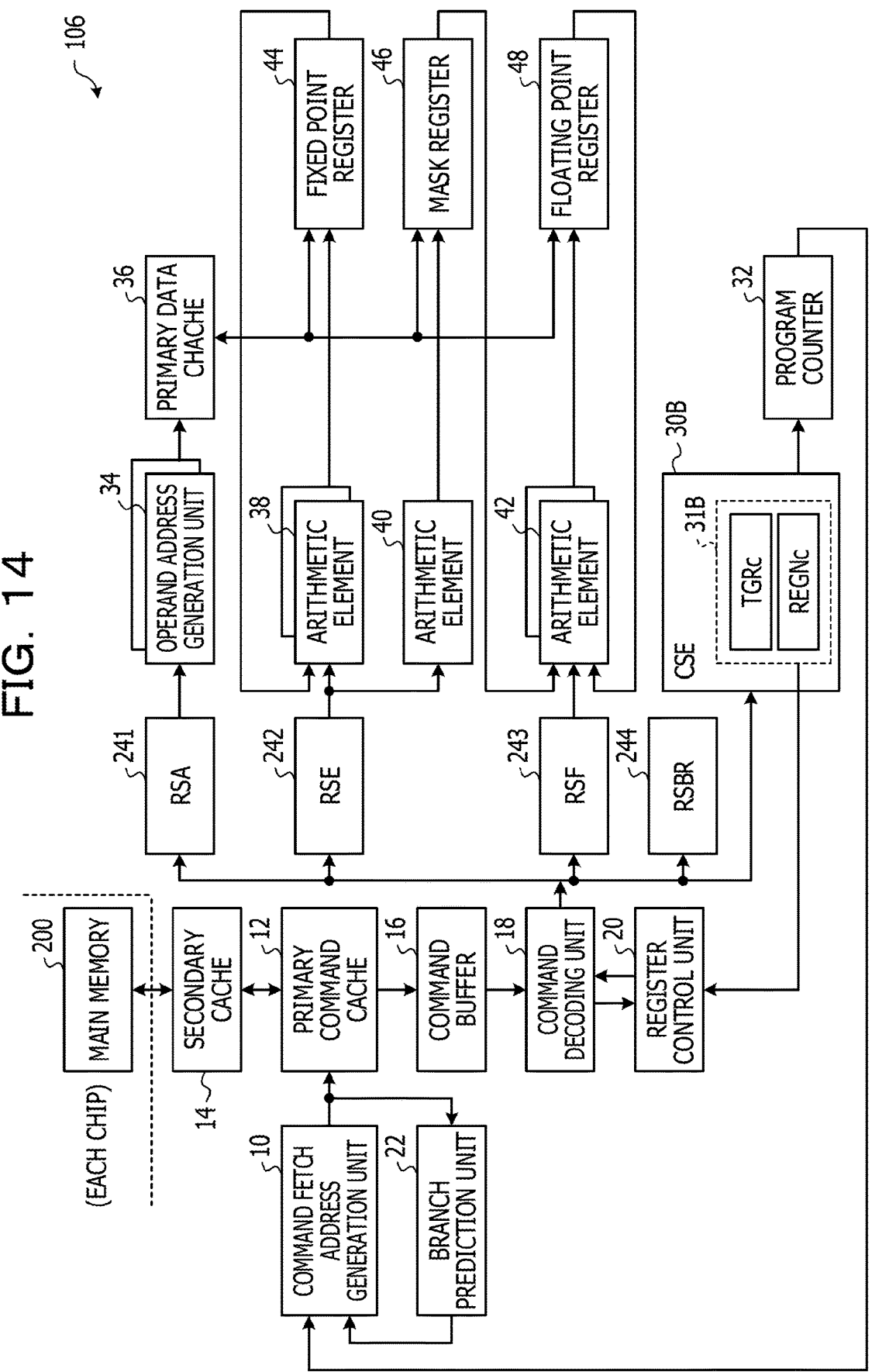
FIG. 14 is a diagram illustrating an example of an arithmetic processing device in another embodiment.

FIG. 14 illustrates an example of an arithmetic processing device in the other embodiment. Elements that are the same as or similar to the elements described in FIG. 6 are given the same reference numerals, and detailed descriptions thereof will be omitted. An arithmetic processing device 106 illustrated in FIG. 14 is, for example, a superscalar processor. The arithmetic processing device 106 may be a processor of another type such as scalar processor. In addition, the information processing system including the arithmetic processing device 106 has the same configuration as that of FIG. 5 and is realized by replacing the reference numeral of CPU of FIGS. 5 to 106.

The arithmetic processing device 106 has the same configuration as that of the arithmetic processing device 102 illustrated in FIGS. 6 and 9 except that a commit control unit 30B is provided instead of the commit control unit 30. For example, the configurations of the command decoding unit 18 and the register control unit 20 are same as that of FIG. 7.

The commit control unit 30B adds an identification information holding unit 31B holding the flag TGRc and the register number REGNc to the commit control unit 30 illustrated in FIG. 6. The register number REGNc indicates the number of the mask register 46 in which the specific value is written by the specific value writing command. The flag TGRc indicates that the register number REGNc is valid. The identification information holding unit 31B may be provided outside the commit control unit 30B. The identification information holding unit 31B is an example of the completion information holding unit.

The commit control unit 30B stores the register number REGNc indicating the mask register 46 in which the specific value is written in the identification information holding unit 31B in the completion processing of the execution of the specific value writing command. Further, the commit control unit 30B sets the flag TGRc to "1" in the completion processing of the execution of the specific value writing command. Furthermore, the commit control unit 30B resets the flag TGRc to "0" in the completion processing of the execution of the mask writing command that writes a value other than the specific value to the mask register 46 indicated by the register number REGN. The flag TGRc is not reset by pipeline clear.

Figure 15:
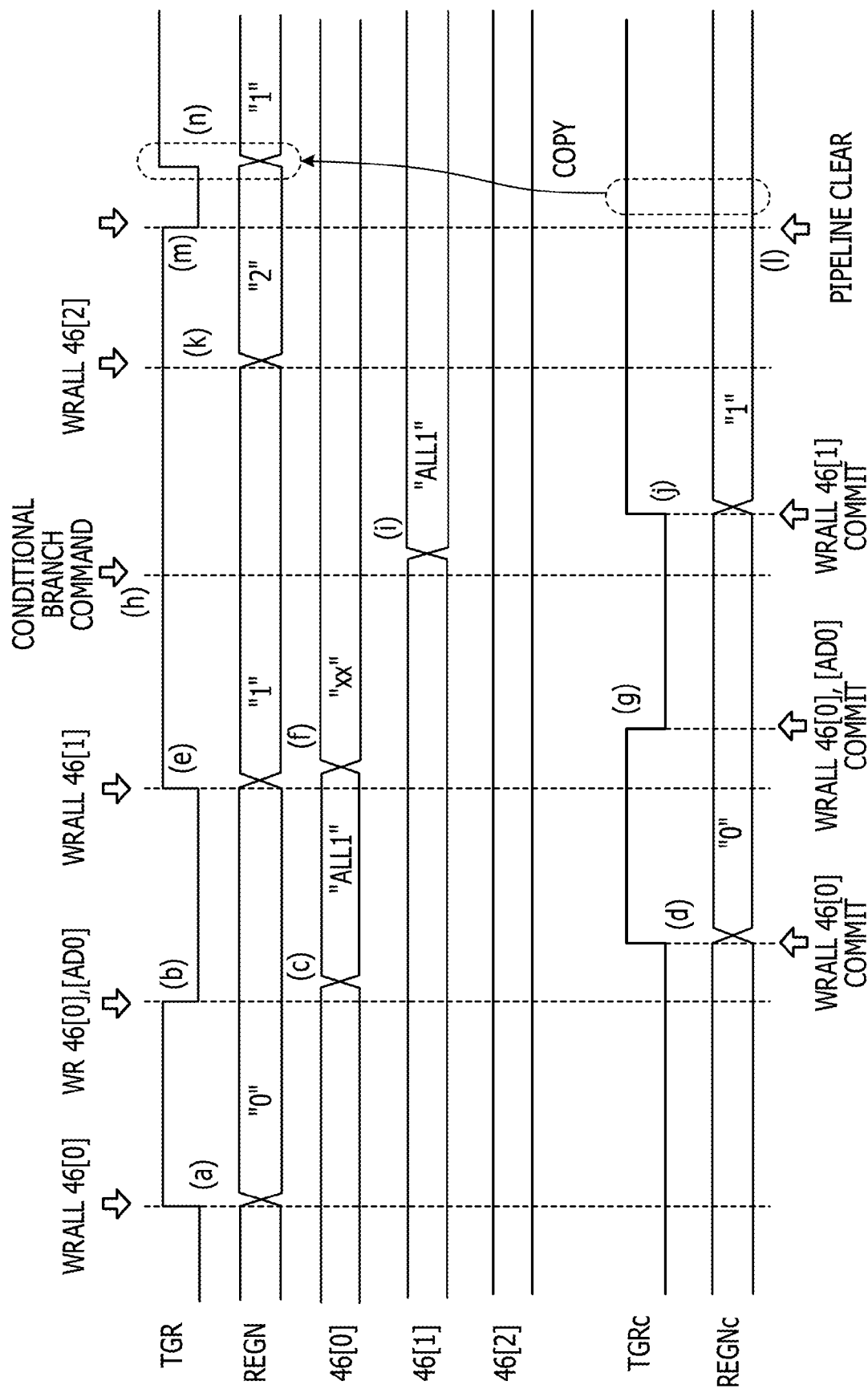
FIG. 15 is a diagram illustrating an example of operations of the arithmetic processing device illustrated in FIG. 14.

FIG. 15 is a diagram illustrating another example of operations of the arithmetic processing device 106 illustrated in FIG. 14. In FIG. 15, the symbol "WRALL" is a specific value writing command for writing a specific value into the mask register 46. "46[0]", "46[1]", and the like after the symbol "WRALL" indicate the number of the mask register 46 to which the specific value is written. In the example illustrated in FIG. 15, the specific value is assumed to be all "1" ("ALL 1").

The symbol "WR" is a writing command such as a load command. "46[0]" after the symbol "WR" indicates the destination for writing the data (mask value), and further "[AD0]" is the data held at the address AD0 of the main memory 200 (mask value). Although the RSE 242 and the RSF 243 each issue a command out of order to arithmetic elements 38 and 40 or 42, in FIG. 15, in order to make the explanation easy to understand, it is assumed that the commands are issued in order.

First, the command decoding unit 18 sets the flag TGR based on the decoding of the specific value writing command WRALL to the mask register 46[0], and stores the register number REGN(="0") in the identification information holding unit 202. ((a) of FIG. 15). Next, the command decoding unit 18 resets the flag TGR based on the decoding of the writing command WR of a value other than the specific value to the mask register 46[0] ((b) of FIG. 15). After that, the specific value writing command WRALL to the mask register 46[0] is executed by the arithmetic element 40, and "ALL1" is written to the mask register 46[0] ((c) of FIG. 15).

The commit control unit 30B receives a report on the completion of the command from the arithmetic element 40, and completes (commits) the command in order. The commit control unit 30B sets the flag TGRc and sets the register number REGNc to "0" based on the completion of the specific value writing command "WRALL 46[0]" ((d) of FIG. 15).

Next, the command decoding unit 18 sets the flag TGR based on the decoding of the specific value writing command WRALL to the mask register 46[1], and stores the register number REGN(="1") in the identification information holding unit 202. ((e) of FIG. 15). After that, the writing command WR to the mask register 46[0] is executed by the arithmetic element 40, and "xx" that is a value other than "ALL1" is written to the mask register 46[0], for example ((f) of FIG. 15). Further, the commit control unit 30B resets the flag TGRc based on the completion of the writing commands "WR 46[0], [AD0]" ((g) of FIG. 15).

The command decoding unit 18 is an example of a decoding unit that decodes a conditional branch command ((h) of FIG. 15). After that, the specific value writing command WRALL to the mask register 46[1] is executed by the arithmetic element 40, and "ALL1" is written to the mask register 46[1] ((c) FIG. 15). The commit control unit 30B receives a report on the completion of the command from the arithmetic element 40, and completes the command in order. The commit control unit 30B sets the flag TGRc and sets the register number REGNc to "1" based on the completion of the specific value writing command "WRALL 46[1]" ((j) of FIG. 15).

Next, based on the prediction by the branch prediction unit 22 that the conditional branch command is satisfied, the command decoding unit 18 decodes the specific value writing command WRALL to the mask register 46[2] which is the command of the branch destination. The command decoding unit 18 sets the flag TGR based on the decoding result and stores the register number REGN(="2") in the identification information holding unit 202. ((k) of FIG. 15).

After this, it is found that the branch prediction is incorrect, and the commit control unit 30B executes pipeline clear to execute the command of the correct branch direction ((l) of FIG. 15). The register control unit 20 (FIG. 7) resets the flag TGR based on the clear signal CLR (not illustrated) issued from the commit control unit 30B along with the pipeline clear ((m) of FIG. 15). As a result, the register number REGN(="2") set for speculative execution may be invalidated, and the identification information holding unit 202 may be inhibited from holding erroneous identification information RINF. That is, it is possible to suppress that the identification information RINF indicates that the mask register 46[2] which does not actually hold the specific value holds the specific value.

The commit control unit 30B copies the value of the flag TGRc to the flag TGR based on the pipeline clear and copies the register number REGNc to the register number REGN ((n) of FIG. 15). Therefore, the flag TGR and register number REGN set in the identification information holding unit 202 may be restored based on the decoding of the specific value writing command WRALL to the mask register 46[1].

In FIG. 15, the flag TGR reset by the pipeline clear is set in accordance with the holding state of the mask register 46[1] to be written by the specific value writing command executed immediately before the pipeline clear. Therefore, when the reading command for the mask register 46[1] is subsequently decoded, the specific value ("ALL1") set in the setting unit 6 is used as the mask operand without operating the mask register 46[1].

Figure 16:
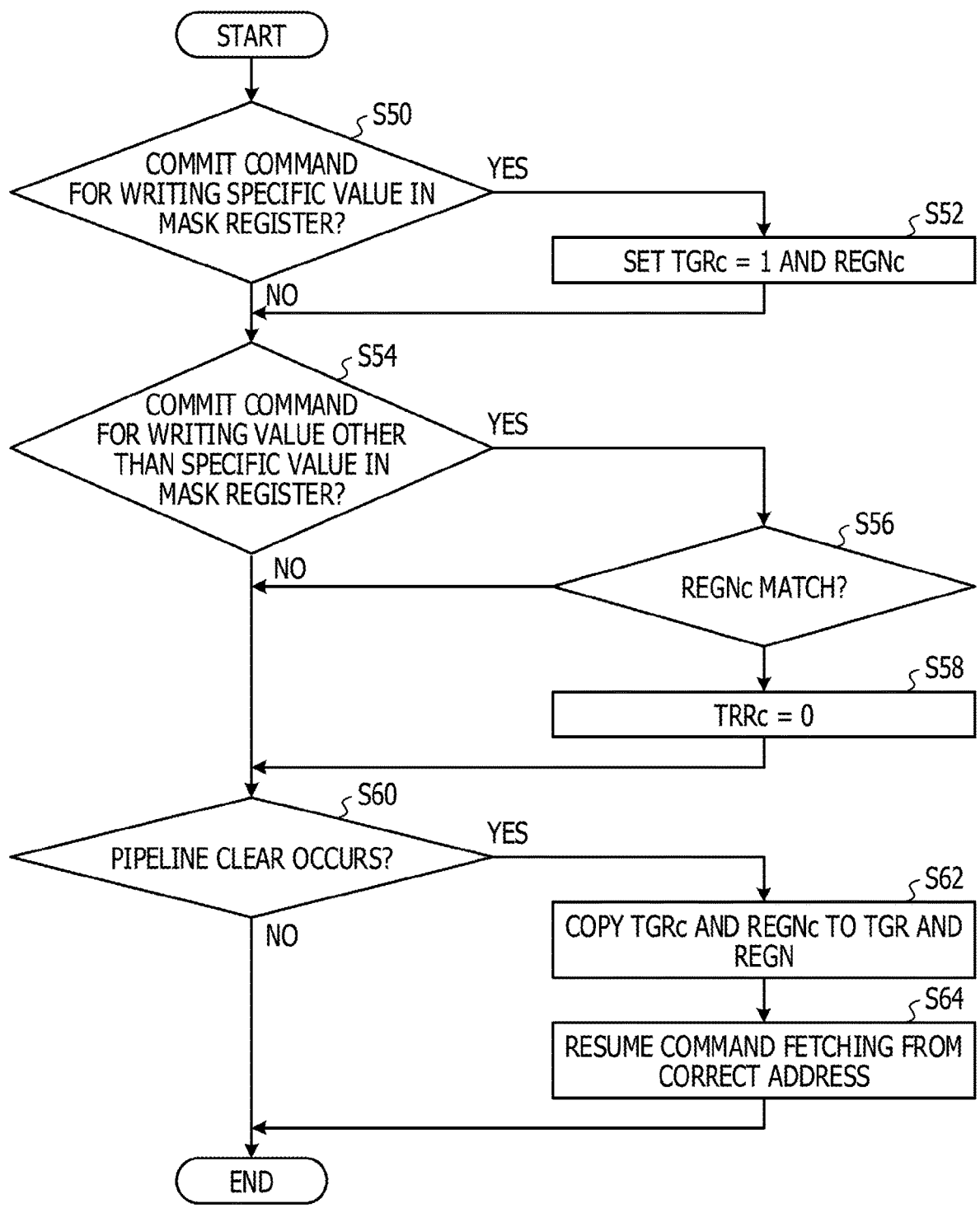
FIG. 16 is a diagram illustrating an example of an operation flow of a commit control unit of FIG. 14.

FIG. 16 is a diagram illustrating an example of an operation flow of a commit control unit 30B of FIG. 14. That is, FIG. 16 illustrates an example of a method for controlling the arithmetic processing device 106. The operation flow illustrated in FIG. 16 is started when the commit control unit 30B executes a command completion processing. The determination of the occurrence of the pipeline clear illustrated in step S60 may be executed at a timing different from the completion processing of the command.

First, in step S50, the commit control unit 30B determines whether to commit a specific value writing command for writing a specific value in the mask register 46 or not. In a case of committing the specific value writing command to the mask register 46, the operation proceeds to step S52 and in a case of not committing the specific value writing command to the mask register 46, the operation proceeds to the step S54. In step S52, the commit control unit 30B sets the flag TGRc to "1" and stores the register number REGNc in the identification information holding unit 31B, and the operation proceeds to step S54.

First, in step S54, the commit control unit 30B determines whether to commit a mask writing command for writing a value other than a specific value in the mask register 46. In a case of committing the mask writing command for wiring the value other than the specific value to the mask register 46, the operation proceeds to step S56 and in a case of not committing the mask writing command for writing the value other than the specific value to the mask register 46, the operation proceeds to the step S60.

In step S56, the commit control unit 30B determines whether the number of the mask register 46 to which a value other than the specific value is written by the mask writing command to commit matches the register number REGNc. If it matches the register number REGNc, the operation proceeds to step S58, and if it does not match the register number REGNc, the operation proceeds to step S60. In step S58, the commit control unit 30B resets the flag TGRc and the operation proceeds to the step S60.

In step S60, the commit control unit 30B proceeds the operation to step S62 when pipeline clear occurs, and ends the operation when pipeline clear does not occur. In step S62, the commit control unit 30B copies the value of the flag TGRc to the region where the flag TGR of the identification information holding unit 202 is stored, and copies the register number REGNc to the region where the register number REGN of the identification information holding unit 202 is stored. Next, in step S64, the commit control unit 30B resumes command fetching from the correct address, and ends the operation.

The arithmetic processing device 104 illustrated in FIG. 12 may have a commit control unit 30B instead of the commit control unit 30 (FIG. 6).

Thus, also according to the embodiment described with reference to FIGS. 14 to 16, the same effect as that of the embodiment illustrated in FIGS. 1 to 13 may be obtained. Furthermore, in the embodiment illustrated in FIGS. 14 and 16, when pipeline clear occurs, the state of the identification information holding unit 202 may be returned to the state before pipeline clear occurs. That is, it is possible to restore the flag TGR reset by the pipeline clear to a valid state. As a result, compared with the case where the flag TGR is not restored, the probability that the specific value may be supplied to the arithmetic element 42 as the operand without operating the mask register 46 may be increased, and the power consumption of the arithmetic processing unit 106 is reduced.

Figure 17:
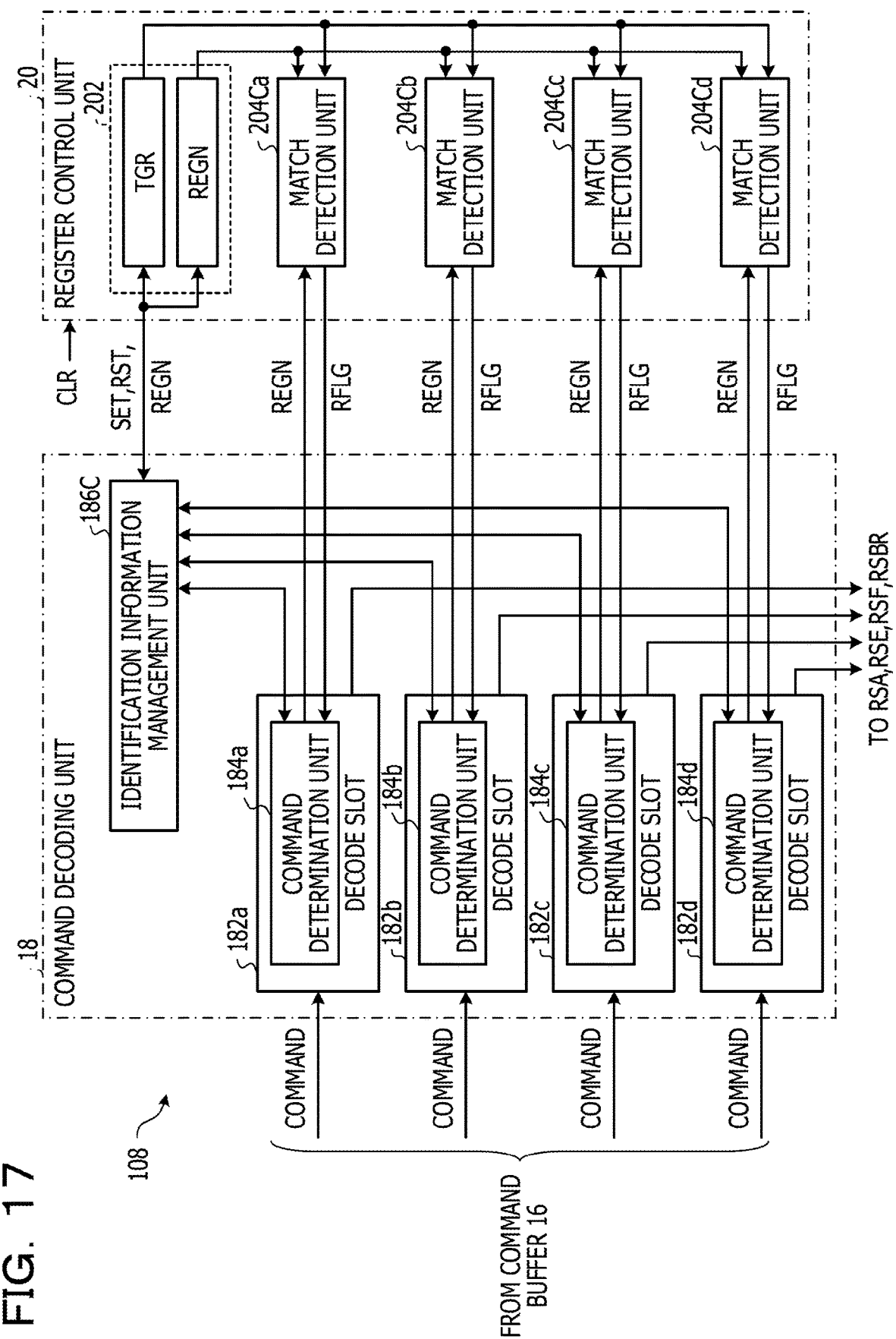
FIG. 17 is a diagram illustrating an example of a command decoding unit and a register control unit in an arithmetic processing device of another embodiment.

FIG. 17 illustrates an example of a command decoding unit and a register control unit in the arithmetic processing device of another embodiment. Elements that are the same as or similar to the elements described in FIG. 7 are given the same reference numerals, and detailed descriptions thereof will be omitted. An arithmetic processing device 108 illustrated in FIG. 17 is, for example, a superscalar processor. The arithmetic processing device 108 may be a processor of another type such as scalar processor. In addition, the information processing system including the arithmetic processing device 108 has the same configuration as that of FIG. 5 and is realized by replacing the reference numeral of CPU of FIGS. 5 to 108.

In this embodiment, the register control unit 20 includes a plurality of identification information holding units 202, and includes a match detection unit 204C (204Ca, 204Cb, 204Cc, and 204Cd) instead of the match detection unit 204 illustrated in FIG. 7. In addition, the command decoding unit 18 includes an identification information management unit 186C instead of the identification information management unit 186 illustrated in FIG. 7. The configuration and functions of the command decoding unit 18 excluding the identification information management unit 186C are the same as those of the command decoding unit 18 illustrated in FIG. 7. The other configuration of the arithmetic processing unit 108 is the same as that of the arithmetic processing unit 102 illustrated in FIG. 6.

The identification information management unit 186C executes an operation of setting any of the identification information holding unit 202 based on the register number REGN received from the four command determination units 184 and the information indicating the mask value. In a case of receiving the register number REGN and the information indicating the specific value from the command determination unit 184, the identification information management unit 186C outputs the identification information RINF (instruction SET for setting the flag TGR and the register number REGN) to one of the identification information holding units 202. At this time, the identification information management unit 186C outputs the identification information RINF to the identification information holding unit 202 in which the flag TGR is reset among the plurality of identification information holding units 202. If the identification information holding unit 202 in which the flag TGR is reset is not present, the identification information management unit 186C outputs the identification information RINF to the identification information holding unit 202 in which the flag TGR is set the oldest. The identification information holding unit 202 that outputs the instruction SET and the register number REGN may be determined by the least recently used (LRU) method.

In a case of receiving the register number REGN and information indicating a value other than the specific value from the command determination unit 184, the identification information management unit 186C determines whether there is the identification information holding unit 202 that holds the register number REGN. When the identification information holding unit 202 holding the register number REGN is present, the identification information management unit 186C resets the flag TGR of the identification information holding unit 202 holding the register number REGN. If there is no identification information holding unit 202 that holds the register number REGN, the identification information management unit 186C does not execute writing of the identification information RINF to the register control unit 20.

When the register control unit 20 receives the clear signal CLR from the commit control unit 30 (FIG. 6), the register control unit 20 resets the flags TGR of all the identification information holding units 202. Therefore, a case where the branch prediction by the branch prediction unit 22 is missed or the like, the flag TGR which may not be set may be suppressed from being continuously set, and a malfunction of the arithmetic processing device 108 may be suppressed.

In a case where the register number REGN is received from the command determination unit 184, each match detection unit 204C detects whether there is the identification information holding unit 202 that holds the register number REGN. In a case where the identification information holding unit 202 holds the register number REGN, each match detection unit 204C reads the value of the flag TGR held together with the register number REGN, and outputs the flag information RFLG based on the value of the flag TGR.

However, in the following case, each command determination unit 184 changes the flag information RFLG to the permission state (described later) and outputs the flag information RFLG to the RSF 243. For example, it is assumed that there is a mask writing command for writing a value which is not a specific value corresponding to the register number REGN decoded in another decode slot 182 prior to the description of the mask reading command corresponding to the register number REGN decoded in a certain decode slot 182. In this case, it is required to read a value that is not a specific value from the mask register 46 to be read based on the mask reading command. Therefore, the identification information management unit 186C collects the information items of the mask writing command for writing the value that is not the specific value from each command determination unit 184, and issues an instruction to change the flag information RFLG from the inhibition state (described later) to the permission state to the target decode slot 182 based on the collected information.

Similar to the match detection unit 204 illustrated in FIG. 7, each match detection unit 204C sets the flag information RFLG in the inhibition state in a case where the flag TGR is in the set state (high level) and sets the flag information RFLG in the permission state when the flag TGR is in the reset state (low level). If there is no identification information holding unit 202 that holds the register number REGN, each match detection unit 204C sets the flag information RFLG to the permission state.

The operation of the command determination unit 184 is the same as the operation described in FIG. 7. In this embodiment, the command decoding unit 18 and the register control unit 20 may determine that the plurality of mask registers 46 respectively hold specific values. Thereby, based on a plurality of mask reading commands for a plurality of mask registers 46 holding specific values, a suppression operation of reading out the specific values set in setting unit 50 as mask operands while suppressing the operation of each mask register 46 may be performed. As a result, power consumption of the arithmetic processing device 108 at the time of execution of the command may be further reduced compared to the arithmetic processing device 102 illustrated in FIG. 6.

In the arithmetic processing device 104 illustrated in FIG. 12, the register control unit 20 may have a plurality of identification information holding units 202A. In this case, the function of the match detection unit 204C is added to the match detection unit 204A, and the function of the identification information management unit 186C is added to the identification information management unit 186A. Similarly, the command decoding unit 18 and the register control unit 20 of the arithmetic processing unit 106 illustrated in FIG. 14 may be replaced with the command decoding unit 18 and the register control unit 20 shown in FIG. 17. Furthermore, the arithmetic processing device 104 illustrated in FIG. 12 may have a commit control unit 30B shown in FIG. 14 and a plurality of identification information holding units 202A shown in FIG. 17.

Thus, also according to the embodiment illustrated in FIG. 17, the same effect as that of the embodiment illustrated in FIGS. 1 to 16 may be obtained. Thereby, in the embodiment illustrated in FIG. 17, even in a case where the plurality of mask reading commands are respectively decoded, the inhibition operation of reading the specific value set in the setting unit 50 as the mask operand may be executed while inhibiting the operation of each of the mask registers 46. As a result, power consumption of the arithmetic processing device 108 at the time of execution of the command may be further reduced compared to the arithmetic processing device 102 illustrated in FIG. 6.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
   a decoding circuit configured to decode a command;
   a command execution circuit configured to execute the command decoded by the decoding circuit;
   a register circuit configured to include a plurality of registers for holding data used by the command execution circuit;
   an identification information holding circuit configured to store identification information for identifying a register indicated by the decoded command when the decoded command is a "register writing command" indicating that a value to be written by the decoded command is identical to a specific value; a setting circuit configured to hold the specific value; and
   an operation control circuit configured to execute an inhibiting processing when the command decoded by the decoding circuit is a "register reading command" for requesting that a value is read out from the register identified by the identification information held in the identification information holding circuit, the inhibiting processing including inhibiting an access of the register by the register reading command and selecting the specific value held in the setting circuit.

2. The arithmetic processing device according to claim 1, wherein the decoding circuit includes
   a plurality of decoders, each of the plurality of decoders being configured to decode the command, thereby the plurality of decoders is configured to decode a plurality of "register writing commands" in parallel, and
   an identification information management circuit configured to determine identification information stored in the identification information holding circuit based on the plurality of register writing commands when the plurality of decoders decodes the plurality of "register writing commands" in parallel.

3. The arithmetic processing device according to claim 2, wherein the identification information management circuit is configured to
   when there is the register writing command for writing the specific value in the plurality of register writing commands which are decoded in parallel, determine for each register whether there is a register writing command for writing a value other than the specific value after the register writing command of the specific value, and
   store identification information corresponding to the last register writing command in command description among the register writing commands of the specific value which does not have a register writing command of a value other than the specific value in the identification information holding circuit, subsequently.

4. The arithmetic processing device according to claim 2, wherein the identification information held by the identification information holding circuit includes register information and flag information, the register information indicating the register in which the specific value is written by the register writing command, and the flag information indicating whether the register information is valid, and
   wherein the identification information management circuit is configured to set the flag information to be invalid when there is no register writing command of the specific value in the plurality of decoded commands in parallel and there is a register writing command for writing a value other than the specific value to the register indicated by the register information.

5. The arithmetic processing device according to claim 4, further comprising:
   a branch prediction circuit configured to predict whether a branch will be executed by a branch command,
   wherein the flag information held by the identification information holding circuit is set to be invalid based on a first instruction, the first instruction being a command for requesting to cancel the execution of the instruction output in a case where the prediction by the branch prediction circuit is missed.

6. The arithmetic processing device according to claim 5, further comprising:
   a completion processing circuit configured to execute command completion processing in order based on the command of which execution is completed by out of order; and
   a completion information holding circuit configured to store first information that is the same information as the identification information held by the identification information holding circuit based on the completion processing of the command by in order by the completion processing circuit,
   wherein the completion processing circuit is configured to store the first information held by the completion information holding circuit in the identification information holding circuit after the flag information is set in an invalid based on the first instruction.

7. The arithmetic processing device according to claim 2, further comprising:
   a notification circuit configured to notify corresponding information based on a query from a decoder that has decoded the register reading command, the corresponding information indicating whether the register to be accessed by the register reading command corresponds to the identification information held by the identification information holding circuit, wherein each of the plurality of decoders is configured to output "the corresponding information from the notification circuit" and "register reading command" to the operation control circuit, and wherein the operation control circuit is configured to determine whether to execute the inhibition processing based on the corresponding information.

8. The arithmetic processing device according to claim 1, wherein the identification information held by the identification information holding circuit includes register information and flag information, the register information indicating the register in which the specific value is written by the register writing command, and the flag information indicating whether the register information is valid, and wherein the operation control circuit is configured to execute the inhibition processing when the register information indicates the register whose value is read by the register reading command, and the flag information indicates that the value is valid.

9. The arithmetic processing device according to claim 8, wherein the decoding circuit is configured to set the flag information to be invalid when a register writing command for requesting to write a value other than the specific value to the register indicated by the register information is decoded, and wherein the operation control circuit is configured to execute permission processing when the flag information is invalid, the permission processing including permitting register access by the register reading command and not selecting the specific value held in the setting circuit.

10. The arithmetic processing device according to claim 1, wherein the operation control circuit includes a selector configured to select any one of output of the setting circuit, output of the register circuit and input of the register circuit, and wherein the operation control circuit is configured to transmit a selection signal instructing that the output from the setting circuit is selected to the selector in a case where the inhibiting processing is executed.

11. The arithmetic processing device according to claim 1, wherein each of the plurality of registers is configured to be selected by an address output from the operation control circuit, and wherein the operation control circuit is configured to maintain a first address logic without changing from a second address logic when the access to the selected register is inhibited based on the register reading command, the first address logic being an address logic output by the register circuit, and the second address logic being an address logic output by a former register access cycle.

12. The arithmetic processing device according to claim 1, wherein the decoding circuit is configured to store the identification information and specific value identification information in the identification information holding circuit, the specific value identification information being information for identifying the specific value, wherein the setting circuit is configured to hold a plurality of types of the specific values, and wherein the operation control circuit is configured to execute the inhibiting processing when the command decoded by the decoding circuit is a register reading command for reading a value from a register identified by the identification information held in the identification information holding circuit, the inhibiting processing being configured to select the specific value corresponding to the specific value identification information held in the identification information holding circuit from the plurality of types of specific values held by the setting circuit.

13. The arithmetic processing device according to claim 1, wherein the identification information holding circuit includes a plurality of regions for holding a plurality of items of the identification information, wherein in a case where a register writing command for writing the specific value to any of the plurality of registers, is the decoding circuit is configured to store the identification information in any of the plurality of regions, and wherein in a case where the decoding circuit decodes a register reading command for reading a value from the register identified by the identification information held in any of the plurality of regions, the operation control circuit is configured to execute the inhibiting processing.

14. A control method implemented by an arithmetic processing device, the method comprising:

decoding, by a decoding circuit of the arithmetic processing device, a command;

executing, by a command execution circuit of the arithmetic processing device, the command decoded by the decoding circuit;

storing, by an identification information holding circuit of the arithmetic processing device, identification information for identifying a register indicated by the decoded command when the decoded command is a "register writing command" indicating that a value to be written by the decoded command is identical to a specific value, the register being any of a plurality of registers, each of the plurality of registers being configured to hold data used by the command execution circuit;

holding, by a setting circuit of the arithmetic processing device, the specific value; and executing, by an operation control circuit of the arithmetic processing device, an inhibiting processing when the command decoded by the decoding circuit is a "register reading command" for requesting that a value is read out from the register identified by the identification information held in the identification information holding circuit, the inhibiting processing including inhibiting an access of the register by the register reading command and selecting the specific value held in the setting circuit.

* * * * *